Aug. 9, 1960     K. C. ALLEN     2,948,465
RECORDING SCALE
Filed Nov. 21, 1955     9 Sheets-Sheet 1
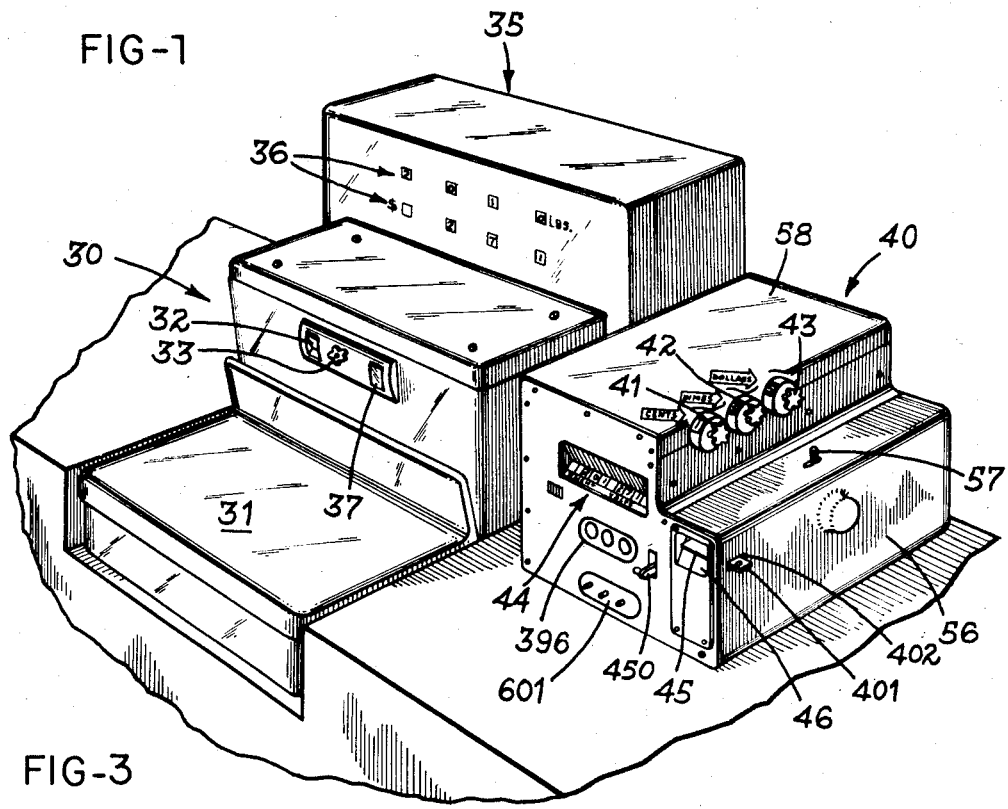
FIG-1
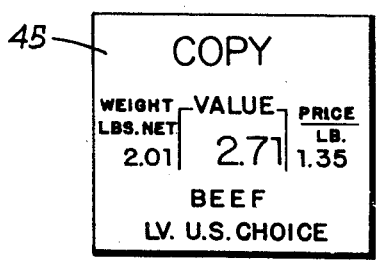
FIG-3
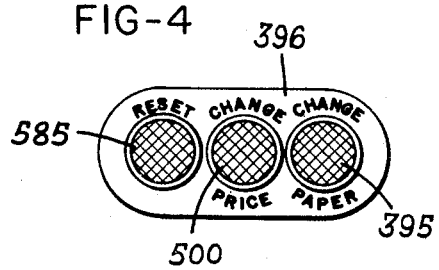
FIG-4
FIG-2
INVENTOR.
KENNETH C. ALLEN
BY
*Marechal, Biebel, French & Bugg*
ATTORNEYS

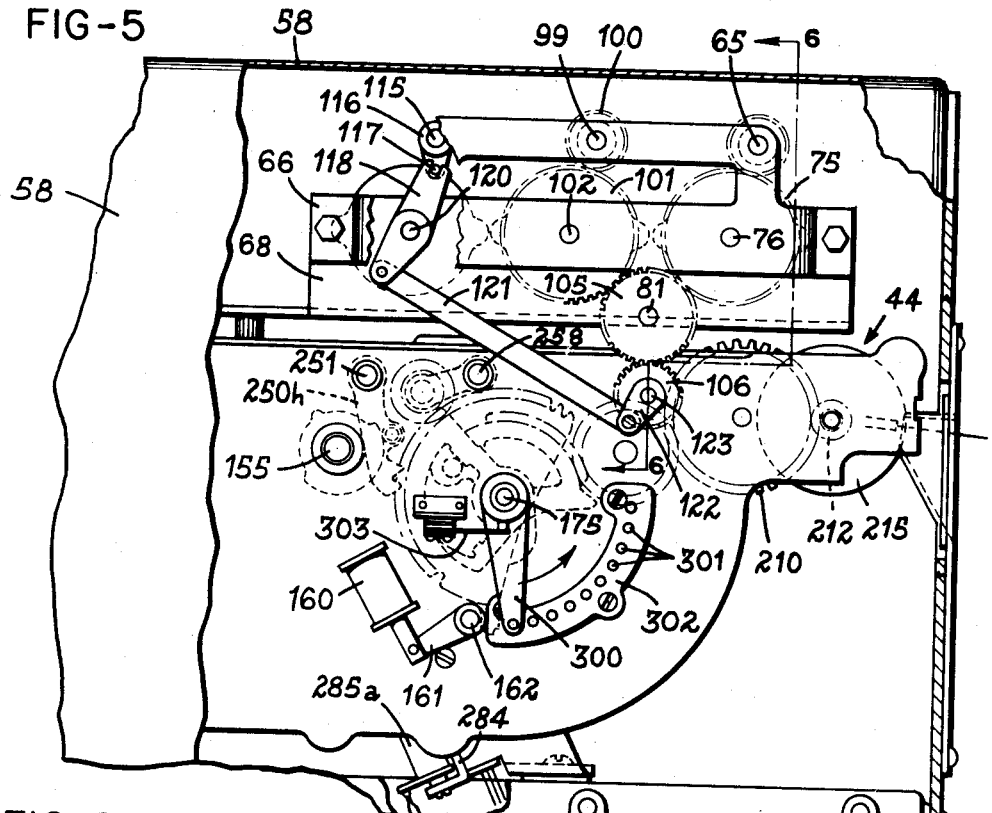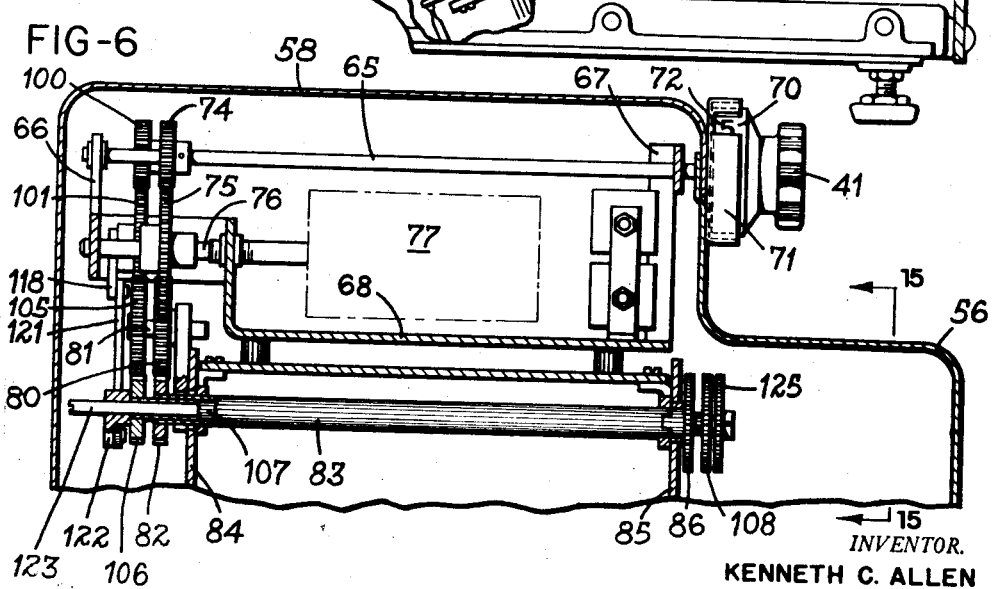

Aug. 9, 1960 K. C. ALLEN 2,948,465
RECORDING SCALE
Filed Nov. 21, 1955 9 Sheets-Sheet 3
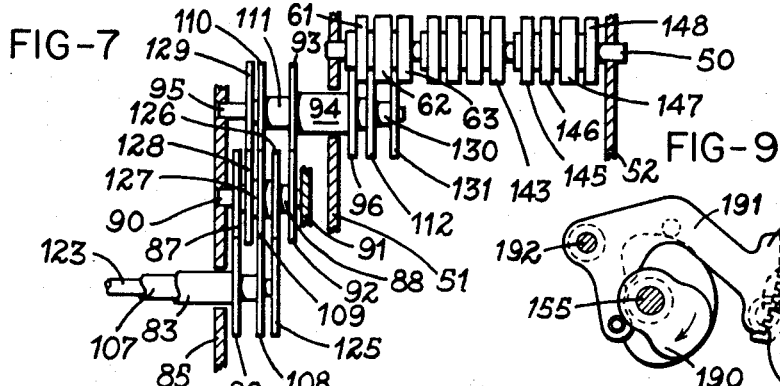
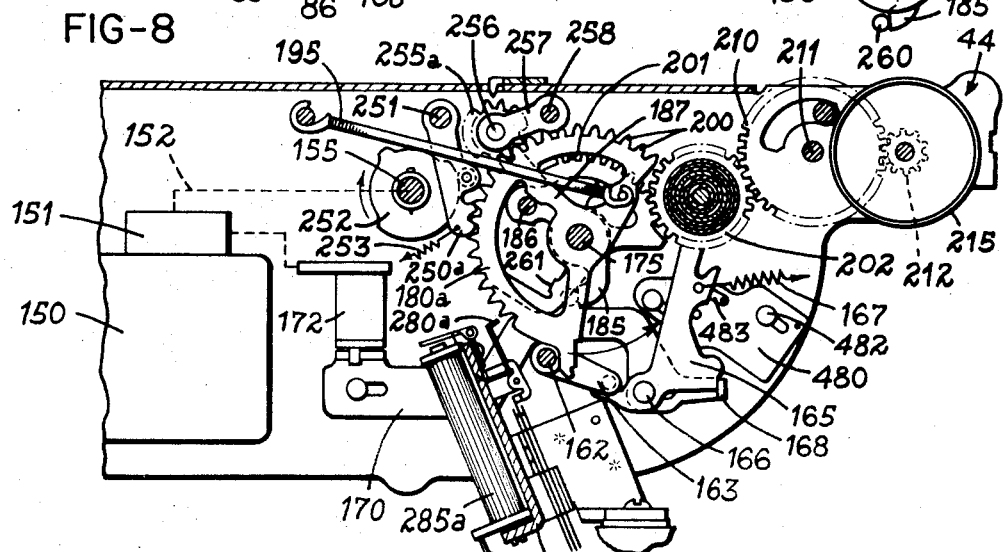
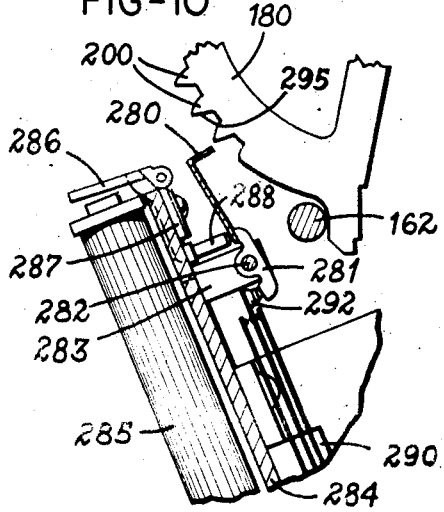
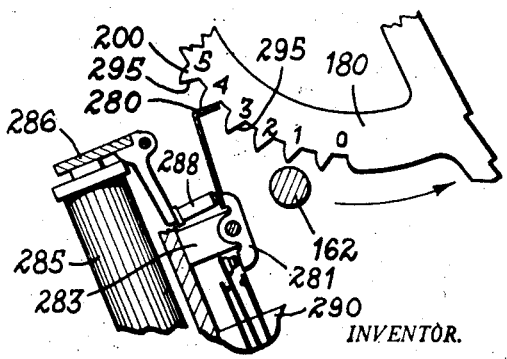
INVENTOR.
KENNETH C. ALLEN
BY
Marechal, Biebel, French & Bugg
ATTORNEYS

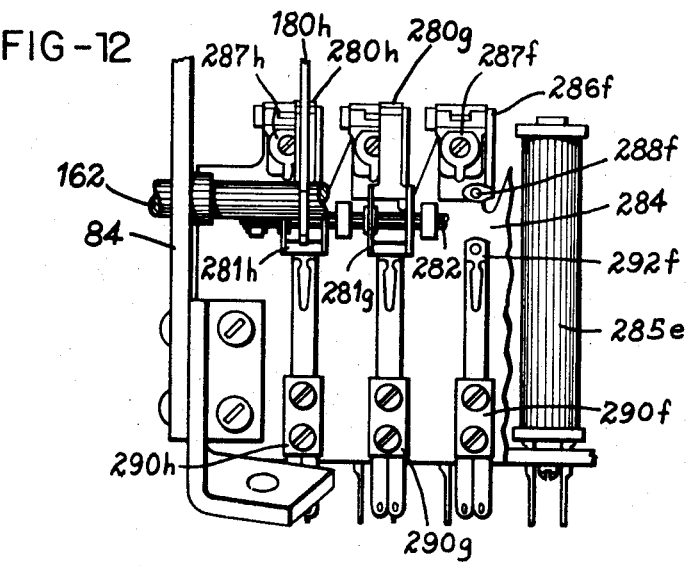
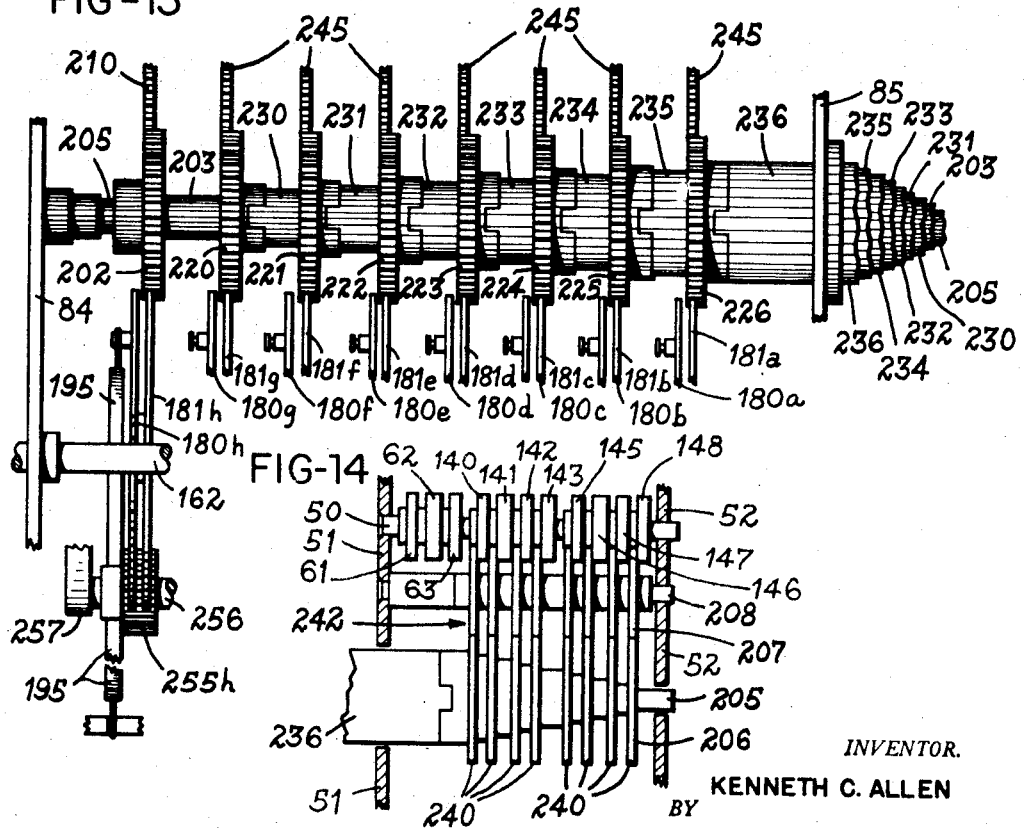

Aug. 9, 1960  K. C. ALLEN  2,948,465
RECORDING SCALE
Filed Nov. 21, 1955  9 Sheets-Sheet 5
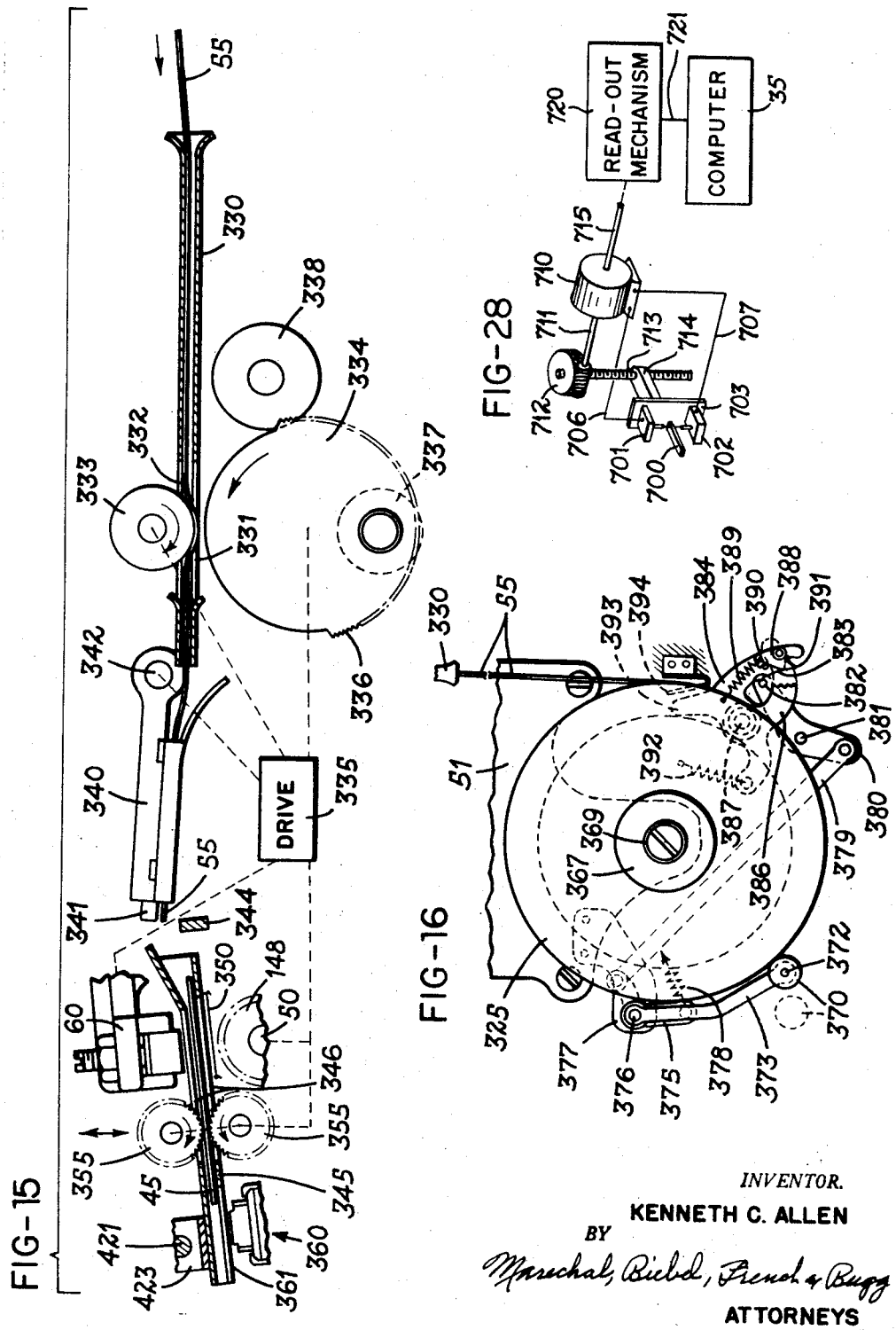
INVENTOR.
KENNETH C. ALLEN
BY
Marechal, Biebel, French & Bugg
ATTORNEYS

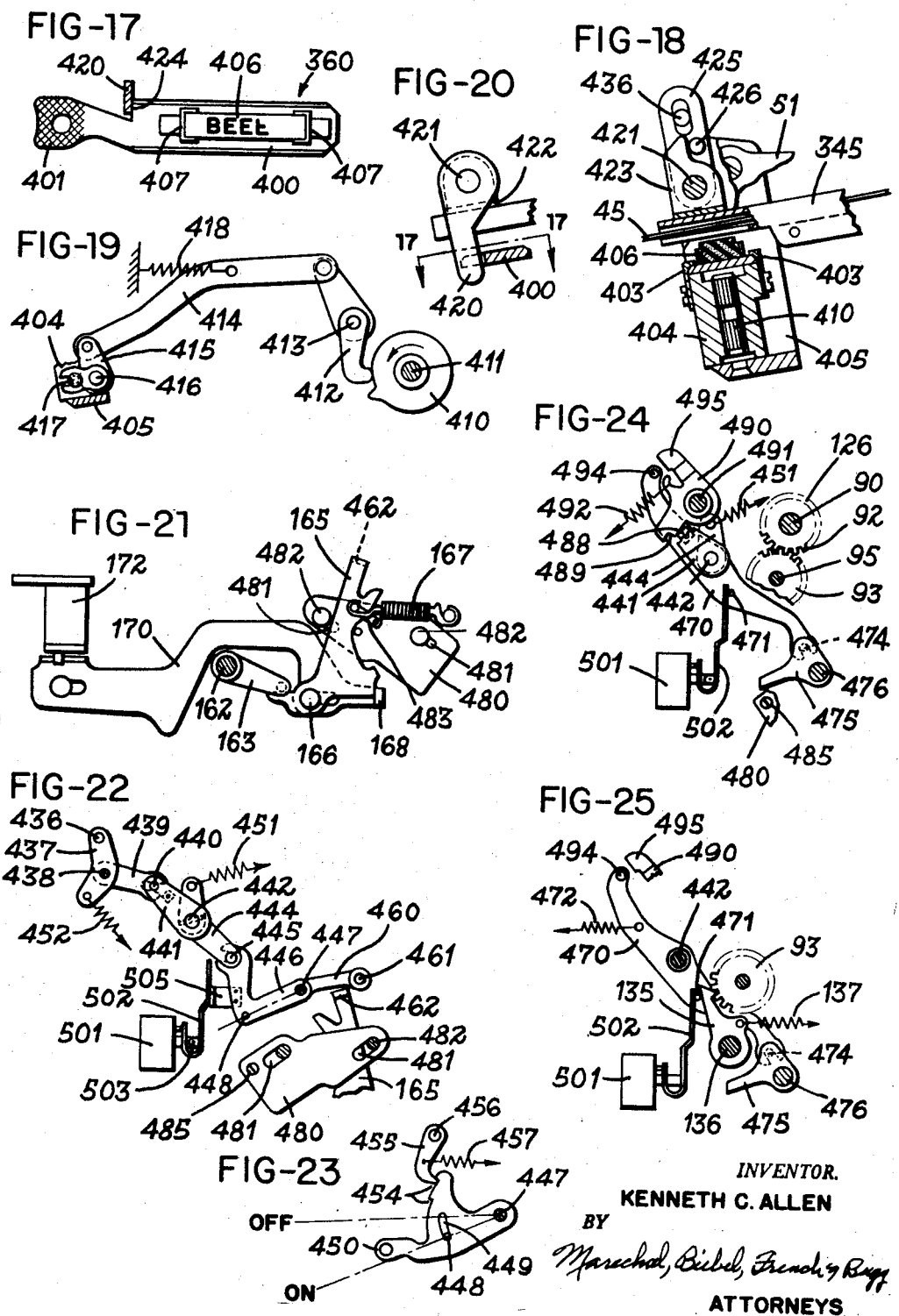

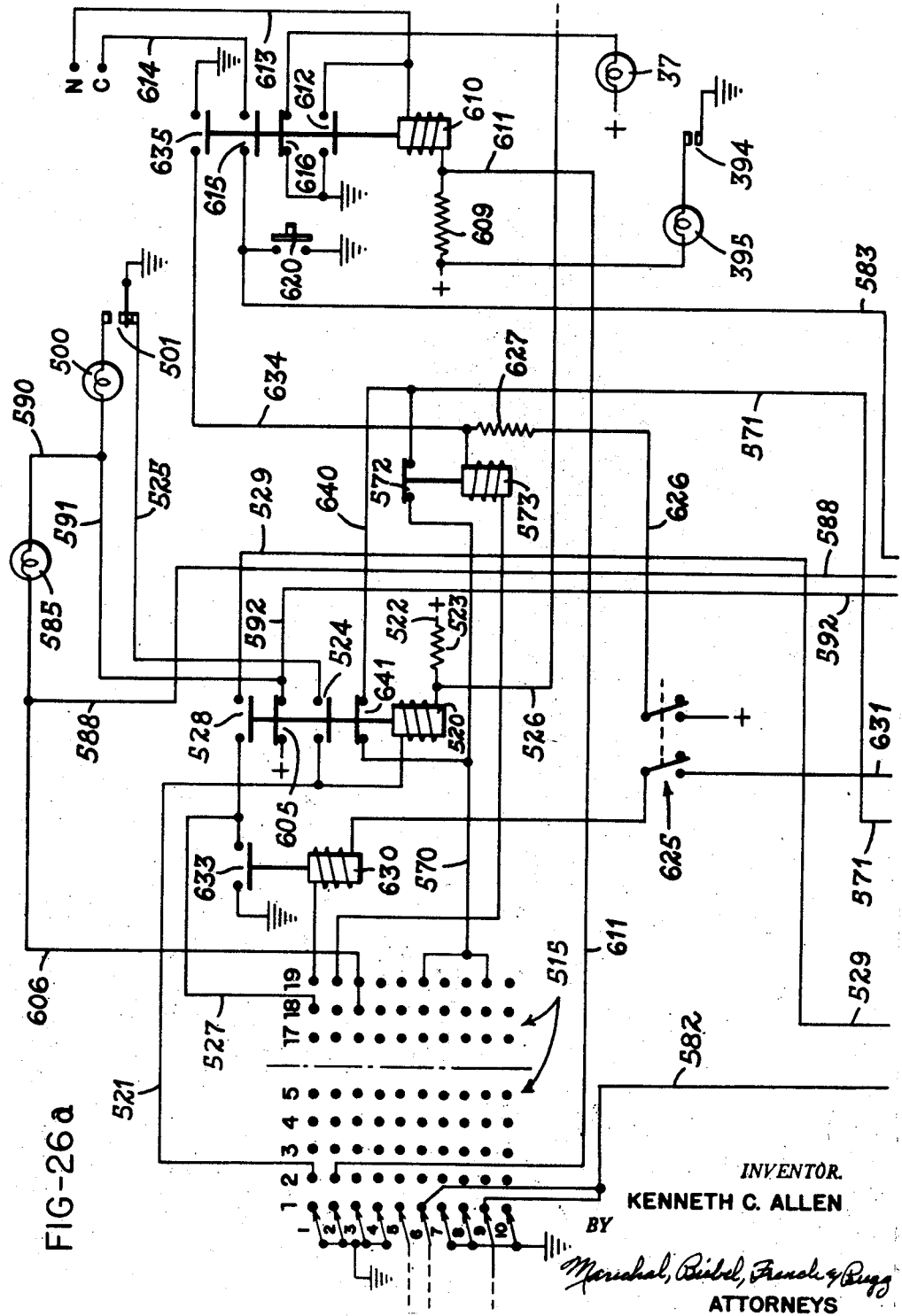

Aug. 9, 1960 K. C. ALLEN 2,948,465
RECORDING SCALE
Filed Nov. 21, 1955 9 Sheets-Sheet 8

INVENTOR.
KENNETH C. ALLEN
BY
Marechal, Biebel, French & Bugg
ATTORNEYS

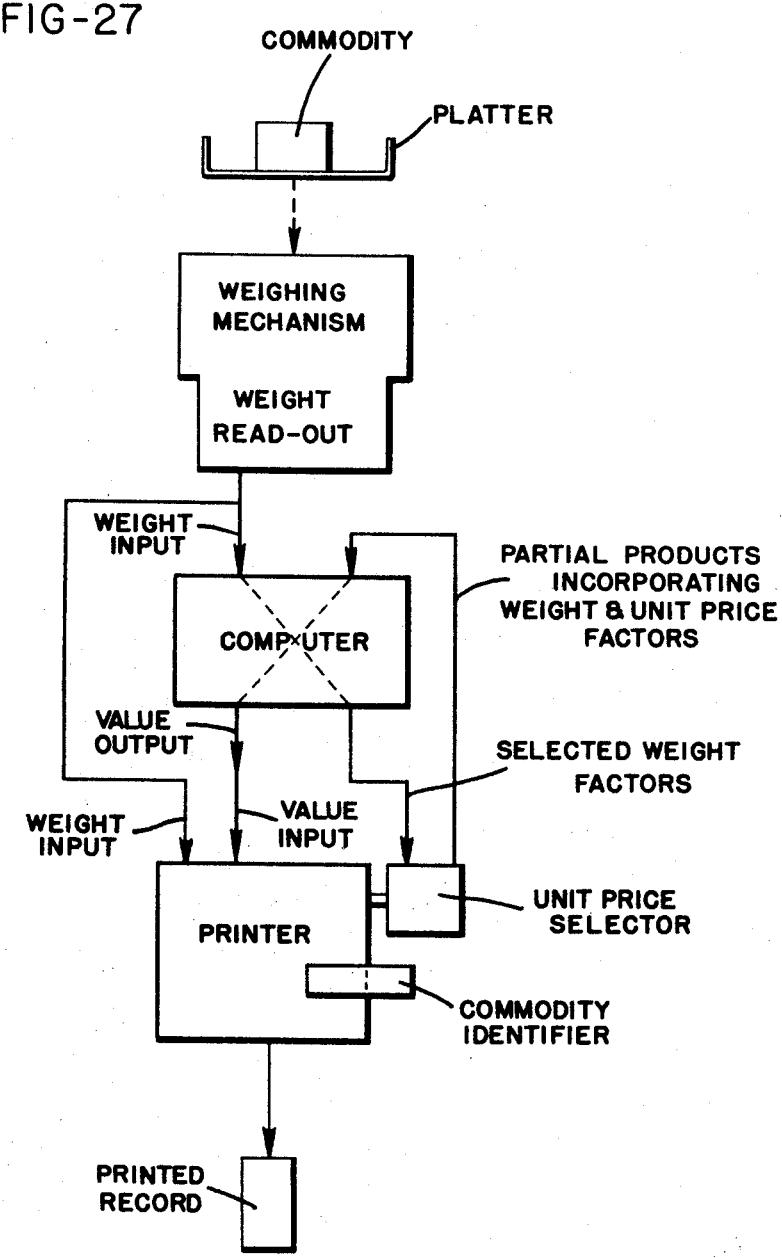

United States Patent Office 2,948,465
Patented Aug. 9, 1960

2,948,465

RECORDING SCALE

Kenneth C. Allen, Dayton, Ohio, assignor to The Hobart Manufacturing Company, Troy, Ohio, a corporation of Ohio Filed Nov. 21, 1955, Ser. No. 548,148

26 Claims. (Cl. 235—58)

This invention relates to registers, and more particularly to electrically controlled register apparatus.

The invention is of special interest and application in conjunction with a computing device to register the final computations of the computing device, and it is particularly applicable to a register which is adapted to issue a ticket, label or continuous tape record bearing the desired information thereon. For example, the invention is disclosed hereinafter in conjunction with a measuring instrument in the form of a weighing scale and an associated computing device to provide a complete weighing and computing apparatus wherein the final product is a printed ticket or label bearing thereon a record of the weight, unit price and computed value of the weighed article or material.

It is a primary object of the invention to provide a register mechanism adapted to be associated with an electrical computer for producing a record, either visual or printed or both, of data developed in the output of the computer, the data being set rapidly and accurately into the mechanism.

Another object is to provide such a mechanism in which the operating cycle begins as soon as the data is available from the computer and in which such data is set into the mechanism during the progress of the cycle so that the entire operation is very fast.

An additional object is to provide such a register mechanism in which quick acting solenoids are energized from the output of the computer as the cycling of the mechanism proceeds, acting directly on indexing elements in the mechanism to set such elements at the proper positions to correspond with the data supplied from the computer, eliminating the normal keyboard and the conventional presetting of the keys thereof prior to initiation of the operating cycle.

It is another object of the invention to provide a register of the above outlined type which is capable of successfully handling a plurality of different variable data such as weight and computed value in the case of a weighing scale, and especially which does not require initial setting up in response to receipt of the data to be registered but which instead will be effective in the course of its operating cycle both to set its own controls and also to adjust its register members in accordance with such setting of its controls.

It is a further object of the invention to provide apparatus for use in prepackaging operations in a foodstore or the like in which a series of wrapped articles are placed successively on a weighing platform of a scale which supplies weight data to a computer having controls which are manually set for the unit price and in which the computer actuates a printer to print tickets showing the commodity, its weight, price and computed value, the tickets being produced rapidly and made available for application to each article as soon as it is removed from the platform.

It is also an object of the invention to provide combined apparatus for weighing, computing and printing as outlined above wherein the sequence of operations is such that a subsequent weighing and computing operation can be initiated even before the preceding printing operation is completed without interfering with proper functioning of any of the parts, wherein an error introduced during the operating cycle automatically prevents completion of the cycle to avoid printing of an incorrect ticket or label, and wherein an appropriate signal is given to the operator of both the occurrence and the nature of any such error in order that he may quickly make the proper correction.

Still further objects and advantages of the invention will be apparent from the following description, the accompanying drawings and the appended claims.

In the drawings:

Fig. 1 is a perspective view showing a complete installation embodying register apparatus in accordance with the invention and including a weighing scale, a computer actuated by the scale, and a printing unit for issuing a printed ticket showing the commodity, its weight, unit price, and the computed value of each article weighed on the scale;

Fig. 2 illustrates a printed ticket of the type issued by the apparatus of Fig. 1;

Fig. 3 is an enlarged fragment of Fig. 1 showing certain control buttons;

Fig. 4 is a view similar to Fig. 3 showing a set of signal lights on the apparatus of Fig. 1;

Fig. 5 is a somewhat diagrammatic view of a portion of the register apparatus of Fig. 1 looking from left to right in Fig. 6 with the casing broken away;

Fig. 6 is a fragmentary section on the line 6—6 of Fig. 5;

Fig. 7 is a somewhat diagrammatic and developed view illustrating a portion of the drive to the type wheels;

Fig. 8 is an enlarged fragmentary view looking in the same direction as Fig. 5 and showing a part of the drive mechanism;

Fig. 9 is a fragmentary view illustrating another portion of the drive of Fig. 8;

Fig. 10 is an enlarged fragment of Fig. 8;

Fig. 11 is a view similar to Fig. 10 showing an operated position of the illustrated parts;

Fig. 12 is a fragmentary view looking generally from right to left in Fig. 8;

Fig. 13 is a developed view showing a portion of the operating mechanism and looking generally upwardly in Fig. 8;

Fig. 14 is a developed continuation of the right hand end of Fig. 13;

Fig. 15 is a fragmentary view in vertical section illustrating the ticket printing mechanism of Fig. 1 and looking generally from right to left in Fig. 1 as indicated by the line 15—15 of Fig. 6;

Fig. 16 is a detail view illustrating the paper supply mechanism for the ticket printing apparatus of Fig. 15;

Fig. 17 is a detail view of a typical commodity key and its associated lock, the view being taken as indicated by the line 17—17 of Fig. 20;

Fig. 18 is a fragmentary view partly in elevation and partly in section illustrating the mechanism for printing the designation of the commodity on each ticket and looking in the same direction as in Fig. 15;

Fig. 19 shows the actuating mechanism for the commodity key;

Fig. 20 is a fragmentary view illustrating the mechanism for locking the commodity key in position;

Fig. 21 is a fragmentary view showing in detail certain of the parts for initiating the printing cycle and looking in the same direction as in Fig. 5 wherein the same parts are found;

Fig. 22 illustrates one of the interlock mechanisms for the printing apparatus for preventing operation of the printing apparatus if the commodity key is not in proper position;

Fig. 23 illustrates a further interlock mechanism associated with the commodity key and unit price mechanism;

Figs. 24 and 25 are further fragmentary views illustrating the mechanism of Fig. 22 and other parts associated therewith;

Figure 26B:
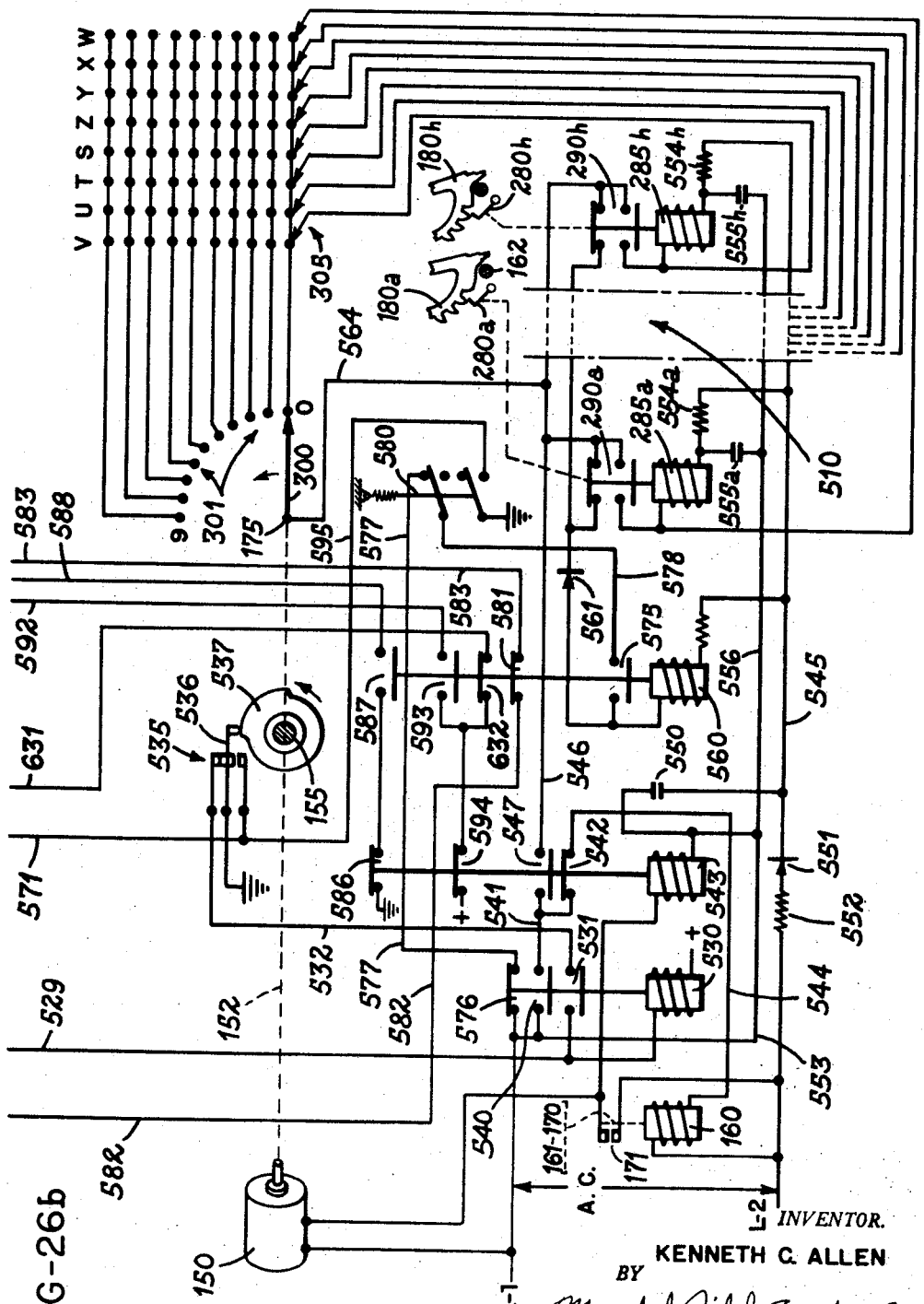

Figs. 26a and 26b together constitute the wiring diagram for the indicating and printing apparatus of Figs. 1–25;

Fig. 27 is a block diagram illustrating the operation of the apparatus of Figs. 1–25; and Fig. 28 (sheet 5) is a fragmentary perspective view illustrating the weight read-out mechanism in the system of Figs. 1 and 27.

Referring to the drawings, which illustrate a preferred embodiment of the invention, the complete ticket printing scale construction of Fig. 1 incorporates a power operated scale 30 having a platter 31 which receives the article or load to be weighed, an example of a satisfactory power operated scale being disclosed in my copending application Serial No. 376,136 filed August 24, 1953. The scale 30 is shown as provided with a visual indication 32 of the weight reading, but this is primarily for use in setting the tare adjustment by means of the knob 33. For use in conjunction with the present invention, the weighing operation of the scale 30 produces an analogue response corresponding to the precise weight of the weighed article and transmits this response to a computing apparatus 35 which reads out the precise position of the analogue response of the scale in terms of pounds and hundredths of a pound, and which also computes the value of the load in accordance with a preset price per pound. An example of a suitable such computing apparatus is disclosed in detail in my copending application Serial No. 436,218 filed June 11, 1954, and the computer 35 may provide a visual indication of the weight and computed value as indicated at 36 in Fig. 1. The scale is also provided with a signal light 37 which operates as described in said application Serial No. 436,218 to indicate when the computing operation is advanced sufficiently to permit the load to be removed from the platter and the next load placed thereon.

In accordance with the present invention, the weight and value read out and computed by the computer 35 are in turn transmitted in digital form to a register apparatus identified generally at 40 in Fig. 1. This apparatus 40 includes manual control knobs 41, 42 and 43 for presetting the price per pound of the commodity being weighed, and it also is shown at 44 as provided with a visual indication of weight and computed value. The principal function of the apparatus 40 is to print and issue tickets or labels, such as 45 in Fig. 2, with each ticket bearing thereon information as to the identity and grade of the commodity, together with its weight, price per pound and computed value. Successive such tickets 45 are issued from the apparatus 40 at 46 in Fig. 1, and reference is made to my copending Patent No. 2,824,726 disclosing ticket feeding mechanism which has been found especially satisfactory for incorporation in the unit 40.

Referring to Fig. 7, the actual printing of the weight, price per pound and computed value on each ticket 45 is effected by a plurality of type wheels all carried by a shaft 50 mounted between the side plates 51 and 52 of the printing frame located within the right hand side of the unit 40. This part of the apparatus, together with the feeding mechanism for the strip 55 of tickets 45 as described hereinafter, is enclosed by a cover 56 having a latch 57 to provide for ready access to the strip feeding mechanism inside the casing 58. The several type wheels all operate in conjunction with an impression hammer 60 as shown in Fig. 15.

There are three type wheels for printing the price-per-pound designations, a wheel 61 for pennies, a wheel 62 for dimes and a wheel 63 for dollars. Figs. 5–7 best illustrate the mechanism for setting these type wheels. A shaft 65 is mounted between bracket portions 66 and 67 of a frame 68, and the shaft 65 projects at one end through the housing 58 to receive the knob 41, which includes a dial 70 enclosed by a cover 71 having a small viewing slot 72 therein proportioned to expose a single digit on dial 70. As shown in Fig. 1, the other knobs 42 and 43 are provided with similar dials and slotted covers for convenient indexing and reading.

The shaft 65 also carries a pinion 74 meshing with a gear 75 on shaft 76 driving a rotary selector switch indicated diagrammatically at 77 which transmits to the computer 35 the setting of the knob 41 as described in detail in my copending application Serial No. 436,218. The gear 75 also drives an idler gear 80 on a stud 81, and the gear 80 in turn drives a gear 82 on one end of a tube 83 journaled in side frame plates 84 and 85. The other end of tube 83 carries a pinion 86 meshing with a gear 87 on a tube 88 rotatable on a stud 90 mounted between the plate 85 and a second plate 91. The tube 88 also carries a gear 92 meshing with a gear 93 on one end of a tube 94 carried by a stud 95, and the other end of tube 94 carries a gear 96 which meshes with gear teeth on the hub of the type wheel 61.

The drive for adjusting type wheel 62 is transmitted from knob 42 to a shaft 99 similar to shaft 65 and carrying a pinion 100 meshing with a gear 101 on a shaft 102 which also drives a rotary selector switch corresponding to the switch 77. The gear 101 meshes with an idler 105 on stud 81 which in turn drives a gear 106 on one end of a tube 107 telescoped within the tube 83. The other end of tube 107 carries a pinion 108 meshing with a gear 109 free on stud 90 which in turn meshes with a gear 110 on a tube 111 telescoped within the tube 94. The other end of tube 111 carries a pinion 112 which meshes with gear teeth on the hub of the type wheel 62.

The knobs 41 and 42 and their associated type wheels 61 and 62 are mounted for rotation through a complete series of ten positions, but the knob 43 for dollars will normally not need more than three positions, namely 0, 1 and 2. The drive for adjusting the type wheel 63 is transmitted from knob 43 by a shaft 115 mounted similarly to the shaft 65 and carrying at its inner end a crank 116. The pin 117 on the crank 116 engages in a slot in one end of a bell crank 118 on a shaft 120 which corresponds to the shafts 76 and 102 and which similarly drives a selector switch. The bell crank 118 is also connected by a link 121 with a crank 122 which is secured to one end of a shaft 123 extending through the tube 107. The other end of shaft 123 carries a pinion 125 which meshes with a gear 126 on a short tube 127 on the stud 90. The tube 127 in turn carries a similar gear 128 meshing with a gear 129 on one end of a tube 130 free on the stud 95 within tube 111, and at the other end of tube 130 is a pinion 131 meshing with gear teeth on the hub of type wheel 63.

It will thus be seen that provision is made for individual presetting of each of the type wheels 61, 62 and 63, as well as for transmitting the preset condition of these type wheels to the computer 35, by means of the selector switches such as 77, to control the actions of the computer in computing the value of each load on the scale platter, these switches corresponding to the switches P, Q and R in my application Serial No. 436,218. Provision is also made for indexing each of these type wheels accurately in its desired setting. Referring to Fig. 25, each of the intermediate gears 93, 110 and 129 is provided with a cooperating retaining pawl 135 free on stud 136 secured in the frame plate 85 and urged into yielding engagement with the teeth of its associated gear by a spring 137.

There are two other sets of type wheels also mounted on the shaft 50. The middle set 140–143 prints the computed value on each ticket 45 as indicated in Fig. 2, and the other set of type wheels 145–148 prints the weight in pounds and hundredths of a pound, each type wheel in each set thus corresponding to a specific column in the group of four columns capable of reproducing any value from 00.00 to 99.99. For ordinary use with a scale of the type employed for food merchandising, there is usually a low limit on the maximum scale load, for example twenty-five pounds, but it will be apparent that this does not actually limit the range of the device.

Each of the type wheels 140–143 and 145–148 must be individually set by the computer 35 for each weighing operation. Accordingly, novel controls are provided by the invention for this purpose, acting in conjunction with a mechanical drive which is in many respects similar to that shown in Robertson Patents 1,816,263 issued July 28, 1931; 1,929,652 issued October 10, 1933, and 2,056,485 and 2,056,486 issued October 6, 1936. Additional disclosure of interest to the illustrated apparatus, but not pertinent to the present invention, will be found in said Robertson patents and also in Goodbar et al. 2,730,038 issued January 10, 1956.

There are essentially duplicate drive means for each of the type wheels 140–143 and 145–148, and the drive for a single such type wheel will be described in detail, namely the type wheel 140 which prints the penny column of the computed value of the weighed material. The drive originates from a motor 150 connected through a clutch 151 and gear train indicated diagrammatically at 152 with the main cam shaft 155. The motor 150 and clutch 151 are both actuated at the start of a printing cycle by a solenoid 160 which is energized by the computer 35 upon completion of its computing operation as described hereinafter in connection with the wiring diagram. This solenoid 160 operates through an arm 161 to rock the shaft 162 which in turn carries an actuating arm 163 for rocking a lever 165 on a pivot 166 against a spring 167 out of engagement with a bent over ear 168 on the release pitman 170. As soon as the pitman 170 is released, it is urged by a spring (not shown), to the left as viewed in Fig. 8 and caused to close the motor switch contacts 171, to engage the clutch 151, and to release the switch lock lever indicated diagrammatically at 172, all as described in detail in the above Robertson patents.

A complete operation of the machine requires one revolution of the cam shaft 155 in clockwise direction as viewed in Figs. 8 and 9, and after completion of this revolution, the control lever 165 is restored to its position shown in Fig. 8 and also in Fig. 21. This action opens the motor switch 171, disengages the clutch 151, and restores the switch lock lever to its holding position, all as described in Robertson Patent No. 2,056,486.

The drive connection from the cam shaft 155 to the individual type wheels includes a rock shaft 175 extending completely across the main frame. This rock shaft carries a pair of differential members identified generally as 180 and 181 for each of the type wheels 140–143 and 145–148, these members for the type wheel 140 being a primary segment 180a and a secondary segment 181a, and the identical members for the remaining type wheels being identified as 180b—180h and 181b—181h, respectively. Adjacent the ends of shaft 175 there are fixed a pair of bales 185, and these bales carry a bar 186 which extends through the segments 180 in abutting relation with the intermediate spoke portion 187 of each segment.

The shaft 175 is rocked back and forth during each revolution of the cam shaft 155 through the action of a cam 190 (Fig. 9) which drives a bell crank 191 pivoted on a stud 192. The bell crank 191 is formed at one end as a gear segment 193 and this segment meshes with a segment 194 pinned on the rock shaft 175. Each primary segment 180 is normally biased in counterclockwise direction as viewed in Fig. 8 by an elongated spring 195, but movement of the segment is limited by abutment of its intermediate spoke 187 with the bar 186. Thus when the rock shaft 175 is rocked in counterclockwise direction, the primary segments 180 can follow in the same direction, but when the rock shaft is moved in clockwise direction, the bar 186 will restore the primary segments to their home position shown in Fig. 8.

The secondary segments 181 are of essentially the same construction as shown in the Robertson patents, and each includes one set of teeth which effectively match the teeth 200 on the associated segment 180, and which therefore are not visible in Fig. 8, and a second set of teeth 201 or a portion of the segment of smaller radius than segment 180. The teeth 201 on segment 181h for type wheel 148 mesh with a gear 202 carried by a tube 203 mounted on a shaft 205 extending completely across the frame of the machine. At the other end of the tube 203 is a pinion 206 which meshes with an idler 207 on a shaft 208, and the idler 207 in turn meshes directly with gear teeth on the hub of the type wheel 148.

Provision is also made for similarly driving the indicator wheels which provide the visual indication at 44 of the reading of the printer. Referring to Figs. 8 and 13, the gear 202 also meshes with an idler 210 on a shaft 211, and this idler 210 in turn meshes with gear teeth 212 on the hub of an indicator wheel 215.

The drive arrangement to the other type wheels is essentially the same from the motor 150 to the associated secondary segment 181. Each segment 181, however, meshes with a separate gear on a separate tube telescoped over the tube 203 and shaft 205, these gears being identified as 220–226 and the tubes 230–236 respectively. At the opposite ends of the tubes 230–236 is a corresponding plurality of gears identical in function with gear 206 and identified generally as 240, and each gear 240 meshes with one of a plurality of idlers 242 on the shaft 208 which in turn mesh with gear teeth on the hub of the associated type wheel as shown in Fig. 14. Each of gears 220–226 also meshes with an idler 245 corresponding to the idler 210 and similarly driving an indicator at 44 corresponding to the indicator 215.

The simplest operation of this apparatus as described up to this point will take place if the type wheel 140 is to print the digit "9." Fig. 8 shows the segment 180a in the home position which it occupies at the beginning and end of each cycle. The two segments 180a and 181a are held together by an aligning pawl 250a pivoted at 251 and controlled by a cam 252 on cam shaft 155 in cooperation with a follower roller on the pawl and a spring 253. There is one of these pawls for each pair of segments, adapted to engage simultaneously the teeth 200 and similar teeth on segment 181, and each pair of segments is also adapted to mesh with a clutching pinion 255a free on a rod 256 carried by a plurality of arms 257 secured on a rock shaft 258. The shaft 258 is rocked back and forth to engage and disengage the pinions 255 with the segments in a manner explained in Robertson Patent 2,056,486.

When the drive is started as described to rotate the cam shaft 155, and during approximately the first 30° of rotation of the cam shaft, the aligning pawls 250 and the clutch pinions 255 will both be retracted out of engagement with the segments. Next, the cam 190 will operate as described through the bell crank 191 to rotate the rock shaft 175 in counterclockwise direction, thereby carrying the bales 185 through an angle equal to approximately ten of the teeth 200 on the primary segment 180, this movement being shown as approximately 90° and limited by contact of the bales with opposite sides of a stop pin 260 (Fig. 9). During this movement, the bar 186 will engage the pad 261 on the secondary segment 181a and rotate the latter to a position corresponding to the "0" position of the associated type wheel.

During the movement of the bales 185 as described, the spring 195 will carry the primary segment 180a through the same 90° of arc as the bales. Then upon completion of this part of the cycle, the clutch pinion 255a will be returned into engagement with the segments to lock them together, and just prior to this action, the pawl 250a is momentarily shifted into engagement with the segments in order to assure that their teeth will be properly aligned for engagement with the pinion 255a.

Thereafter, the shaft 175 and the bales 185 rotate in clockwise direction, and during this action, the bar 186 will engage the segment spoke 187 and move the segment 180a in clockwise direction back to the home position shown in Fig. 8. Since the segment 181a is clutched to segment 180a by the pinion 255a, it will be moved to the same angular extent as segment 180a, and this action will be transmitted through the segment teeth 201 and the associated gearing to the type wheel 140 and the associated indicator at 44 as previously described.

Special provision is made in accordance with the invention for selective indexing of the primary segments 180 to establish correspondingly adjusted positions of the type wheels, with this control being effected in response to the computing action of the computer 35. Referring particularly to Figs. 8–12, there is a stop finger 280 associated with each segment 180, and two of these fingers 280h and 280g are shown in Fig. 12. Each finger 280 is carried by a rocker 281 pivoted on a shaft 282 carried by brackets 283 which are in turn secured to a plate 284 extending across the device below the segments 180 between the side frames 84 and 85.

A separate solenoid 285 is mounted on the under side of plate 284 in association and is adapted when energized to shift the finger from its retracted position shown in Fig. 10 to an advanced position shown in Fig. 11. A bell crank 286 is pivoted above each solenoid 285 on a bracket 287 mounted on the plate 284, and it normally occupies the position shown in Fig. 10. When the associated solenoid is energized, the bell crank is rotated in clockwise direction, and the projecting pin 289 carried by the lower end thereof pushes the rocker 281 in clockwise direction to advance the finger 280.

A switch 290 is associated with each solenoid 285. The normal position of this switch is shown in Fig. 10. When the solenoid is energized, the lower part of the rocker 281 shifts the switch arm 292 as shown in Fig. 11, and this completes a holding circuit through switch 290 for the solenoid as described hereafter in connection with the wiring diagram. This stop mechanism is duplicated for each type wheel, as indicated by the corresponding solenoids 285a and 285h in the wiring diagram (Fig. 26b).

The operation of a typical stop finger 280 is illustrated in Fig. 11 on the assumption that the associated type wheel is desired to print the digit "4," and Fig. 11 shows the successive teeth 200 on segment 180 correspondingly identified as 0, 1, 2, 3, 4, . . . . The operation of the parts is as already described up to the point at which the shaft 175 begins to rotate in clockwise direction and thus to effect movement of the primary segment 180 under the biasing force of the spring 195. To obtain the digit "4," however, provision is made, as described hereinafter, for energizing the solenoid 285 at the precise instant when the space between the #3 and #4 teeth 200 is opposite the finger 280. Energizing of the solenoid causes finger 280 to snap into this space so that it engages the #4 tooth as the segment continues to move, thus preventing further movement of the segment during the remainder of the counterclockwise movement of the bales 185. It will also be noted in Figs. 10 and 11 that the lowermost ten of the teeth 200 are formed with relatively flat edges 295 on their undersides for engagement with the finger 280 in accurately located position with respect to the other parts, and particularly with respect to the associated secondary segment 181.

The segment 180 will remain in its stopped position shown in Fig. 11 until after the clutch pinion 255 has been re-engaged therewith and with the secondary segment 181, after which the solenoid 285 will be deenergized to disengage the stop finger 280 from the segment. Then during the clockwise movement of the bar 186 with bales 185, when the bar engages the spoke 187 on the primary segment, it will move both segments through the arcuate distance established by the previously stopped position of the primary segment. This arcuate distance is predetermined to produce corresponding rotation of the corresponding type wheel through the associated gearing to set the type wheel in the proper position to print the digit "4." The same procedure will obtain for each other digit from "0" to "9," the only difference in each case being the extent of preliminary arcuate movement of the segment 180, and it will thus be seen that each primary segment, or pair of primary and secondary segments, acts as an indexing member for its associated type wheel.

Provision is made for selectively operating each of the solenoids 285 at the proper instant during movement of its associated primary segment 180 to index each segment individually in accordance with the proper setting of its associated type wheel. Referring first to Fig. 5, a scanner in the form of a wiper arm 300 is secured on one end of the cam shaft 175 for rotation therewith with respect to a series of stations defined by a plurality of contacts 301 mounted by means of a terminal strip 302 on the side frame plate 84. A brush type contact 303 engages the hub of a scanner 300 to connect the scanner into the control circuits as illustrated in detail in the wiring diagram.

There are ten contacts 301, which establish a series of control positions from 0 to 9 as indicated in Fig. 26b. Each of these contacts is in turn connected with a corresponding contact in each of a plurality of selector units in the computer 35, which are represented in the wiring diagram as a plurality of rotary stepping switches each having a wiper contact 305 which is set in accordance with the operation of the scale 30 and the computer 35 as described in detail in my above noted application Serial No. 436,218. More specifically, the four decks of switch contacts designated as S, T, U and V in Fig. 26b represent one additional deck in each of the correspondingly designated stepping switches in application Serial No. 436,218 and indicate tens of dollars, dollars, dimes and cents respectively. Similarly, the four decks of switch contacts designated W, X, Y and Z represent one additional deck in each of the correspondingly designated stepping switches in application Serial No. 436,218 and indicate tens of pounds, pounds, tenths of pounds and hundredths of pounds respectively.

To complete this portion of the description, reference is made to the preceding description in connection with Figs. 8–11 and the operation of the parts to set the type wheel 140 to print the digit "4." During operation of the computer 35 as described in application Serial No. 436,218, the wiper 305 for the V switch deck is set on its #4 contact, which is connected to the #4 contact 301 for the scanner 300. The circuit arrangements are such, as described hereinafter, that when scanner 300 engages its #4 contact during counterclockwise rotation of the cam shaft as viewed in Fig. 5, an energizing circuit will be completed for the solenoid 285a. Since the movement of the associated primary segment 180a is the same initially as for scanner 300, this will cause energizing of solenoid 285a at the precise instant when the space between the #3 and #4 teeth 280 on the segment 180a is opposite the finger 280a. This finger will therefore be caused to snap into this space between the teeth and thereby to index the primary segment for proper subsequent setting of its associated type wheel as described above in connection with Figs. 5–11.

The general arrangement of the mechanism for printing each successive ticket is illustrated in Fig. 15 and is disclosed in detail in my above noted application Serial No. 502,849 and Robertson Patents No. 1,816,263 and No. 2,056,486. The successive tickets 45 are cut from an elongated strip 55 which is fed from a supply roll 325 through an elongated chute 330 having slots 331 and 332 in the upper and lower walls thereof through which the strip is engaged for feeding by a rubber pressure roll 333 in cooperation with a driven cylinder 334 operated intermittently by the main drive which is indicated diagrammatically at 335 and which may, for example, be of the construction shown in Robertson Patent No. 2,056,486. The cylinder 334 includes raised or roughened feed rail portions 336 which establish the forward feeding movement of the strip 55 during each cycle of the apparatus, and the cylinder 334 is also shown as having incorporated therein an adjustable means 337, such as a type wheel or electro, which may be employed to print some of the desired data on each ticket 45, such particularly as the grade of the commodity and/or other identifying data of the type shown adjacent the bottom margin of the ticket in Fig. 2. A detailed disclosure of suitable such printing mechanism is found in Robertson Patent No. 1,816,263, and its cooperating inking roller is shown at 338.

From the feeding chute 330, the ticket strip 55 passes to the knife chute 340 which is carried by a knife 341 pivotally mounted at 342 for cooperative movement inward and away from a stationary cut-off bar 344 to shear successive tickets from the strip. Beyond the knife chute 340 is a further guide chute 345 which is slotted at 346 to provide a printing station receiving the series of type wheels already described in detail in connection with Fig. 7. These type wheels cooperate with an impression hammer 60, the printing ribbon for the impression hammer being indicated fragmentarily at 350.

Movement of the printed ticket beyond the printing station is in the control of a pair of ejector wheels 355 operating in the slots 346 in the chute 345 beyond the printing station. Fig. 15 also shows a key 360 located beyond the ejector wheels 355 for printing on each ticket the commodity designation, shown as "BEEF" in Fig. 2. The commodity key 360 prints through a slot 361 in the under side of chute 345 as described above in detail in the above identified Goodbar et al. application. In addition, provision is made for preventing operation of the apparatus in the event of improper positioning of the commodity key, as described in detail hereinafter in connection with Figs. 17–25 and the wiring diagram.

Provision is made for a visual indication that the tape supply from the roll 325 is approaching exhaustion. Referring particularly to Fig. 16, the supply roll 325 includes a core 367 rotataby supported on a stud 369 mounted on the side plate 51 of the printer frame. The periphery of the supply roll 325 is yieldingly engaged by a sensing roller 370 rotatably mounted on a stud 372 in the outer end of an arm 373 secured to a bell crank 375 which is in turn rotatably mounted by a stud 376 on a bracket 377 secured to the plate 51. A spring 378 is connected between one arm of bell crank 375 and a fixed part of the frame to bias the bell crank in counterclockwise direction as viewed in Fig. 16 in order to maintain the roller 370 in contact with the surface of the supply roll.

The other arm of the bell crank 375 is pivotally connected by a link 379 to one end of a lever 380 free on a stud 381 mounted on the side plate 51. The other arm of lever 380 carries a stud 382 which coacts with a control surface 383 on a control arm 384 fixed to a companion lever 386 pivoted on a stud 387 mounted in the side plate 52. An extension of the control surface 383 is formed by a portion of a pawl 388 freely mounted on a stud in the arm 384, and a spring 389 biases the pawl in counterclockwise direction to maintain the pawl normally in contact with a stop stud 390 in the arm 384.

In the operation of the printing mechanism, as the ticket strip is used up and the diameter of the supply roll 325 decreases, the spring 378 gradually moves the arm 373 and the bell crank 375 counterclockwise, which in turn moves the lever 380 in clockwise direction. This movement of lever 380 causes the stud 382 to move outwardly along the control surface 383 and finally onto the extension of this surface formed by pawl 388. When the supply on roll 325 is practically exhausted, the stud 383 rides over a sharp shoulder 391 on the end of pawl 388, thus releasing arm 384 and lever 386 to the action of a spring 392, which immediately rocks these parts in clockwise direction. This movement continues until an extension 393 on arm 384 engages a switch arm 394 and moves this switch arm to a position completing an energizing circuit for a signal light 395 (Fig. 4) as illustrated in the wiring diagram of Fig. 26a. The signal light 395 is incorporated in a signal light panel 396 on the front of the unit 40 in Figs. 1 and 4, and lighting of this light 395 immediately notifies the operator of the necessity for inserting a new supply roll of ticket strip material.

The commodity key 360 and its operating mechanism are shown in detail in Figs. 17–20. It includes a flat plate portion 400 having at one end a knurled finger portion 401 for use in removing and inserting the key through the slot 402 in the side cover 56 in Fig. 1, and the key fits between two guides 43 mounted on opposite sides of a printing block 404 which is in turn supported underneath the chute 345 by a bracket 405 mounted on the side plate 51. The key portion 400 carries a porous rubber stamp unit 406 which is preferably cemented on the face of the key and may also be provided with retaining clips 407.

The printing block 404 is mounted for reciprocating printing movement on a pair of guide pins 410 carried by the bracket 405. This movement of the printing block is initiated by a cam 410 which is on the same cam shaft 411 as the cam which operates the knife 341 (Fig. 15) as described in Robertson Patent No. 2,056,486. The cam 410 engages one arm of bell crank 412 free on a pivot stud 413, and the other arm of bell crank 412 is pivoted to a link 414 having its other end similarly pivoted to one arm of a bell crank 415 pivoted at 416 on the bracket 405. The other arm of bell crank 415 is slotted and engages a stud 417 projecting from the printing block 404. A spring 418 normally biases the link 414 in the direction to cause bell crank 415 to hold the printing block in its retracted position. When the cam 410 operates bell crank 412, this pulls link 414 against spring 418 and causes clockwise movement of bell crank 415, which in turn causes the printing block 404 to move upwardly and thereby to execute a printing stroke on the under side of the ticket 45 against the upper side of the chute 345. This mechanism and operating cycle are described in detail in the above noted Goodbar et al. patent.

Provision is made for preventing operation of the apparatus in the event of improper positioning of the commodity key 360. A finger 420 is secured to a shaft 421 pivoted in ears 422 and 423 mounted on the upper surface of the chute 345. The depending end of finger 420 is adapted to engage a shoulder 424 near the outer end of the commodity key plate 400 to lock the key in position on the printing block 404. The opposite end of the shaft 423 carries an arm 425 on which there is a stud 426 adapted to abut the upwardly extending portion of the ear 423 to establish a stopped position for the finger 420 in locking relation with the commodity key.

The movements of the locking finger 420 for the commodity key are directly related with the operating control of the apparatus in such manner as to prevent the apparatus from operating if the commodity key is not in proper position. The free end of the arm 425 is slotted to receive a stud 436 carried by a bell crank 437 free on a fixed stud 438. The arm 439 of bell crank 437 is slotted to engage a stud 440 in a crank 441 secured on one end of a short shaft 442 journaled in the frame plate 85, and the other arm 444 of the bell crank carries a stud 445 which engages a slot in a lever 446 pivoted on a fixed stud 447 carried by the frame plate 51. The lever 446 carries a stud 448 which engages a slot 449 in a lever 450 mounted on the stud 447. This lever 450 projects out of the front of the unuit as shown in Fig. 1 for manual actuation when it is desired to change the commodity key. Springs 451 and 452 urge the bell cranks 444 and 437 clockwise and counterclockwise respectively, to cause the stud 436 in cooperation with arm 425 to maintain the stop stud 426 normally in engagement with the ear 423.

The lever 450 includes a rearward extension having two locating notches 454 therein which correspond to the Off and On positions of the lever. These notches coact with a pawl 455 pivoted on a fixed stud 456 in the frame plate 51. A spring 457 urges pawl 455 into engagement with one or the other of notches 454 to retain lever 450 yieldably in either of its two positions.

Figs. 22 and 23 show the lever 450 in its On position and the lever 446 in such position that the finger 420 is in its locking position with respect to the commodity key. When it is desired to remove this key for replacement, the lever 450 is moved upwardly to its Off position, which causes the lower end of slot 449 to raise the stud 448 and thus to rock lever 446 (Fig. 22) in clockwise direction, and this movement acts through bell crank 444 and crank 441 to rock the arm 439 and bell crank 437 in clockwise direction against spring 452. Clockwise rotation of the bell crank 437 in turn operates through stud 436 to rock the arm 425 together with the shaft 423 and finger 420, thus moving the end of finger 420 out of the path of the shoulder 424 on key 360 to release the key for replacement by another key to print a different commodity designation on the successive tickets or labels.

Special provision is made for preventing operation of the apparatus in the event that the commodity key is not properly locked in position. Referring initially to Fig. 22, the lever 446 includes an extension arm 460 carrying a stud 461 which is adapted to be positioned in the path of movement of the lever 165 in the direction to start operation of the apparatus, namely in clockwise direction as viewed in Fig. 22, and in counterclockwise direction as viewed in Figs. 8 and 21. The normal positions of these parts for operation of the printer are as shown in Fig. 22, with the stud 461 out of the path of lever 165. When the lever 450 is moved to its Off position to release the commodity key for removal, the resulting movement of lever 446 swings the stud 461 into blocking relation with lever 165. Conversely, when the lever 165 is moved as already described to start the motor, the ear 462 on its upper end moves into the path of the stud 461 to block movement of levers 446 and 450 to their Off position during the printing cycle.

The above described movement of the lever 450 to release the commodity key for removal also sets up a condition preventing subsequent operation of the printer unless adjustment of the price-per-pound mechanism is made following change of the commodity key. Referring to Figs. 24 and 25, a lever 470 is freely mounted on the shaft 442 and carries a stud 471 adapted to engage the backs of the pawls 135. A spring 472 normally urges the lever 470 in the direction to hold the pawls in engagement with the associated gears, thus supplementing the biasing actions of the springs 137. The lower end of the lever 470 is slotted to engage a stud 474 carried by a pawl 475 free on a stud 476 mounted in the frame plate 84.

Thus whenever any one of the price control knobs 41–43 is rotated, the rotation of its associated intermediate gears 93, 110 or 129 will cause corresponding rocking movement of its associated pawl 135. This movement of any one of the pawls 135 causes corresponding rocking movement of the lever 470, first against and then under the biasing force of its spring 472. The rocking movement of lever 470 in turn causes corresponding rocking movement of the pawl 475, and this action of pawl 475 is employed to prevent actuation of the printer motor unless all of the pawls 135 are properly indexed, as now described.

Referring to Fig. 21, a slide plate 480 is slotted at 481 for sliding movement on a pair of studs 482 secured in the frame plate 84. The lever 165, which is rocked to start the printer motor as already described, is connected with the slide 480 by a link 483 so that the movements of this lever are limited by contact between the opposite ends of the slots 481 and their associated studs 482. The slide 480 also carries a stud 485 in one corner thereof, and when the pawl 475 is rocked from its normal position, its lower end lies directly in the path of stud 485 with slide 480, thus blocking movement of the slide, and hence starting of the printer motor, if the pawl 475 is in its moved position as the result of failure of one of the pawls 135 to be indexed with its associated gear. The same parts also cooperate to lock the price selecting mechanism after the printing cycle has started, since in the resulting moved position of the slide 480, the stud 485 will be located in the path of rocking movement of pawl 475 and will thus act as a mechanical lock against movement of lever 470 and any of the price selectors.

The above movements of the lever 470 are also utilized in conjunction with the locking and unlocking of the apparatus following change of the commodity key. When the lever 450 is moved as described to Off position, the resulting rotation of the crank 441 causes a square stud 488 on crank 441 to move beyond a shoulder 489 on a locking arm 490 free on a stud 491 in the frame plate 84. The arm 490 is then immediately rocked by a spring 492 in counterclockwise direction as viewed in Fig. 24 to move its shoulder 489 into the path of the stud 488 to obstruct return movement of crank 441, and this in turn obstructs return movement of the other connected parts, including the lever 446 and the finger 420, under the biasing force of the springs 451 and 452.

Under these conditions, the slot 449 permits the lever 450 to be shifted back to its On position without movement of its associated parts, and the printer cannot therefore be operated following change of the commodity key unless and until adjustment of at least one of the unit price type wheels 61—63 has been made. As pointed out, the lever 470 is rocked back and forth each time one of these type wheels is moved, and when this occurs, the first movement of lever 470 is in clockwise direction as viewed in Fig. 24. Such movement, therefore, causes a stud 494 at the upper end of lever 470 to engage and push an extension 495 on arm 490, thus simultaneously rocking arm 490 out of the position of engagement of its shoulder 489 with stud 488. This action in turn frees the crank 441 and its connected parts to return to their normal or On positions under the action of the springs 451 and 452.

This return movement of the parts as just described is not possible if the commodity key is not properly inserted in place, since the return movement of the finger 420 to its locking position will be obstructed. In other words, with the finger 420 blocked against complete return movement, its interconnected parts including the lever 446 will similarly be held against return movement, which means that the stud 461 will be in its blocking position with respect to the lever 165. Proper insertion of the key moves the shoulder 424 thereon beyond the finger 420, and then all the parts are free to return as described to their On positions.

Provision is also made for energizing an indicator signal light 500 (Fig. 1) to notify the operator either when the commodity key is not properly located in position or when the commodity key has been changed without corresponding change of the price per pound setting. Referring to Fig. 22, a switch 501 is mounted in fixed position in the frame and is normally open with respect to the light 500 in the position shown in Fig. 26a. An arm 502 for operating switch 501 is pivoted at 503 and extends into the path of a bracket arm 505 on the lever 546 in such manner that whenever lever 446 is in its blocking position with respect to lever 165, switch 501 will be shifted into the position for energizing light 500.

In addition, the arm 502 extends into the path of the stud 471 on lever 470, and this arrangement causes the light 500 to be lighted whenever one of the price-per-pound type wheels is not properly indexed, since the resulting movement of its associated pawl 135 will move lever 470 and stud 471 sufficiently to operate arm 502 with respect to switch 501.

Sequence of operation

The sequential operation of the entire apparatus is illustrated by the wiring diagram provided by Figs. 26a and 26b. Certain of the parts therein have already been previously identified, and in addition, certain of the units shown in the wiring diagram actually form parts of the computer 35 as described in detail in my above application Serial No. 436,218. It will also be noted that in the interests of simplification, six of the eight solenoids 285 and the associated connections have been omitted from Fig. 26b, as indicated at 510.

Operation of the printing apparatus is initiated by means of the ten-level rotary sequence selector switch indicated generally at 515, which represents the unit shown in Fig. 17 of my application Serial No. 436,218 and which has 19 operating positions. Except as described hereinafter, the connections to the switch 515 are as described in my said application. In addition, during the operation of the computer as described above, the eight rotary stepping switches S—Z are operated to set their respective wipers 305 on the proper contacts in accordance with the weight and value of the weighed material, with the result that each of the solenoids 285 is connected with one or another of the contacts 301 which define the series of positions to be traversed by the scanner 300.

The above operations are completed by the computer during progress of the switch 515 from column to column therein. When switch 515 reaches its column 2, it completes an energizing circuit for a relay 520 by means of line 521 and the plus terminal 522 through a resistor 523, and the relay 520 locks itself in through its contacts 524, the line 525 and the lower pair of contacts of switch 501. The relay 520 corresponds to the relay identified as "270" in my above application Serial No. 436,218, and the line 526 corresponds to the line identified as "274" in application Serial No. 436,218. When the switch 515 reaches its column 18, the ground then applied on line 527 is delivered through the closed contacts 528 of relay 520 to a line 529 to complete an energizing circuit to a relay 530, and this relay also locks itself in through its contacts 531 and the line 532 to the switch indicated generally at 535, this switch having a control arm 536 operated by a cam 537 on the main cam shaft 155.

The relay 530 is the control relay for starting operation of the printer. When it energizes, its contacts 540 connect the main A.C. power line L-1 with a line 541 which leads through the back contacts 542 of relay 543 to a line 544 which completes an energizing circuit for the solenoid 160 to the other power line L-2. As soon as solenoid 160 is energized, it operates as described in connection with Fig. 8 to close motor switch 171, and this action completes the starting circuit for motor 150 and also completes an energizing circuit for the relay 543. The latter action breaks the circuit through contacts 542 to solenoid 160 and causes the latter to open, but by this time, the switch 171 is under the control of the printing mechanism and is held closed until the printing cycle is completed, as described in Robertson Patent No. 2,056,-486.

Since relays 530 and 543 are now operated, the series of solenoids 285 have operating power available through line 545, which is a continuation of line L-2, and a line 546 which is connected with line 541 by the closed contacts 547 of relay 543, this line 541 having previously been connected with line L-1 by the closed contacts 540 of relay 530. Incorporated in the wiring is a half-wave D.C. power supply consisting of a condenser 550, a rectifier or diode 551, and a resistor 552 connected as shown by a line 553 between the power lines L-1 and L-2. In addition, associated with each solenoid 285 is a resistor 554 and a condenser 555, the condensers 555 being connected by a line 556 to the line 553.

This power supply provides an initially high D.C. voltage for each solenoid 285 to effect instant operation thereof without varying the voltage on the others of this series of solenoids. Thus each solenoid 285 is initially energized by the discharging of its associated condenser 555, which insures rapid operation of each of these solenoids.

The system includes an additional relay 560 which operates as described hereinafter to prevent improper operation of the printer by sensing non-operation of any of the solenoids 285. The relay 560 is energized from the line 546 by parallel circuits through the closed back contacts of each of the switches 290, which are operated by the solenoids 285, and the diode 561 as shown. Accordingly relay 560 closes as soon as relay 543 is closed.

The above operation takes place during the first 30° of rotation of cam shaft 155 as described above and before any movement of shaft 175 occurs, so that power is thus made available for operation of the solenoids 285 before the motor 150 begins to drive the rock shaft 175 and the scanner 300 through their complete cycles as described above. When this power just becomes available, the scanner 300 is in its home position wherein it is in engagement with its "0" contact. Since closing of relay 530 has caused the scanner to be connected with power line L-1 through the contacts 540 and 547 and the lines 546 and 564, then if any of the wipers 305 are connected with their associated "0" contacts, an energizing circuit will be completed to their associated solenoids 285, with resulting operation of the corresponding stop fingers 280.

As the scanner 300 proceeds across its series of contacts, the same operation is repeated whenever one of the contacts 301 is connected with one of the wiper arms 305. Thus after the scanner 300 reaches its "9" contact, all the solenoids 285 should be energized. When each solenoid 285 energizes, it opens the back contacts of its associated switch 290 and closes its own holding circuit through the other contacts of its switch 290. Therefore, when all the solenoids 285 have been energized, then the energizing circuit for relay 560 will be broken and that relay will open.

After switch 515 arrived at its column 18 to begin the printing cycle, it moved to its position 19 and remained there during the initial rotational movement of the scanner 300. After scanner 300 has reached its "9" contact and before it begins to rotate in the opposite direction, the cam 537 reaches a position wherein the follower on switch arm 536 drops off the high part of the cam, thus breaking the circuit through the top contacts of switch 535 and closing the bottom contacts of this switch.

This action breaks the holding circuit for relay 530 and allows this relay to deenergize, which in turn removes the power from line 541 by breaking the contacts 547 and thus makes it impossible for any solenoid 285 to be energized during the return movement of scanner 300. Also, closing of the bottom contacts of switch 535 places a ground on line 570 to the switch 515, the connection running by way of line 571 and the normally closed contact 572 of a relay 573, and switch 515 accordingly moves from its position 19 to its position 1 in readiness for another computation when properly so instructed by the action of the scale.

During the scanning action of scanner 300 in its first rotational movement, the bails 185 are driving the segments 180 as described above, and the segments are individually indexed by energization of their associated solenoids 235. During the return rotation of scanner 300 with the bails 182, the several type wheels 140—143 and 145—148 are set as already described in readiness for the actual printing operation which is effected by actuation of the impression hammer 60 as described in Robertson Patent 2,056,486. When the printing cycle has been completed, the scanner 300 has returned to its "0" position, the cam 537 has returned to its position indicated in Fig. 26b wherein the upper contacts of switch 535 are closed, and the switch 171 is opened to deenergize relay 543 and to shut off the motor 150.

If it should happen during operation of scanner 300 that any one of the relays 285 fails to energize, then the back contacts of its associated switch 290 will fail to open, and relay 560 will remain energized. Then when relay 530 opens through the action of switch 535, relay 560 will remain closed through its contacts 575, the contacts 576 of relay 530, and the lines 577 and 578 which are connected through one side of the manual reset switch 580. In addition, the contacts 581 of relay 560 will be open to break the connection between the lines 582 and 583, which are the lines effective to start the next operation of the computer and together constitute the line identified as "251" in application Serial No. 436,218. At the same time, when the relay 543 is deenergized, power is supplied to light the error or "Reset" light 585, this circuit running through the back contacts 586 of relay 543, the contacts 587 of relay 560, the lines 588, 590, 591 and 592, the contacts 593 of relay 560 and the back contacts 594 to relay 543.

Further operation can continue from this point only upon operation of the manual reset switch 580, which breaks the circuit between lines 577 and 578 to allow relay 560 to de-energize and thus completes the connection between lines 582 and 583 through the contacts 581 of relay 560. At the same time, the closing of the bottom contacts of reset switch 580 completes a circuit from ground through a line 595 to line 571 for a purpose described hereinafter. The reset switch button 600 is shown as incorporated in a switch panel 601 on the front of the unit 40 as shown in Figs. 1 and 3.

The reset switch 580 must also be operated if an error has occurred in the cycle of the computer 35, as described in my above application Serial No. 436,218, such as a temporary failure of the source of power or an attempt to effect a complete cycle of operation when the scale is in a position below zero or a position representing an overload. If such an error has occurred, the switch 515 will proceed to its column 18, but the relay 520 will in the meantime have been de-energized as described in application Serial No. 436,218, so that its contacts 528 will be open and no power can reach the control relay 530 for starting operation of the printer. Accordingly, after the switch 515 reaches its column 19, it will remain there until the reset switch 580 is manually operated to provide a ground through the line 595 to line 571. During such error period, the light 585 will be lighted by a circuit running from the back contacts 605 of relay 520, and the lines 591 and 590 to a line 606 back to a contact in the third row of columns 18 and 19 of switch 515.

Provision is also made for notifying the operator and preventing further operation of the apparatus whenever the commodity key is changed without change of the price or whenever the price-per-pound selectors are not properly indexed or are moved after computation has been begun and before the printer operates. Thus as previously described, the switch 501 is mechanically operated whenever the commodity key is changed or the price-per-pound selectors are not properly indexed. In either case, the switch 501 will be shifted from the position shown in Fig. 26a to close its upper contacts, thus breaking the holding circuit for relay 520 through its contacts 524 and similarly breaking the energizing circuit through the relay contacts 528 to the printer control relay 530. At the same time, the switch 501 will complete an energizing circuit through its upper contacts for both of the signal lights 500 and 585, the circuit for the light 500 running through line 591 and the now closed back contacts 605 of relay 520, and the circuit for the light 585 running through the line 606 to the switch 515 as described.

If the price-per-pound indicators are not properly indexed at the start of the cycle, the switch 501 will have been shifted to its upper position in Fig. 26a, and the same circuit conditions will exist as described in the preceding paragraph. In other words, the holding circuit for the relay 520 will be broken at the switch 501, the starting power line 529 to the printer control relay 530 will be broken, and both of the signal lights 500 and 585 will light. Printing will accordingly not be possible, and recycling of the computer must be effected as described by actuation of the reset switch 580. The light 585 will indicate the existence of an error, while lighting of the light 500 will identify the error as requiring a change of price setting either because of improper indexing of the price selectors or of failure to change the price after change of the commodity key.

If a price change is attempted after computation has begun and before the printer begins to operate, operation of switch 501 will be only temporary, causing deenergizing of relay 520 as described but not continuously lighting the light 500. Under these conditions, the light 585 will be lighted in the same manner as in the event of an error in the operation of the computer as already described, owing to the fact that the computation has been based on more than one unit price. It is not possible to change the price setting after the printing cycle has begun, because during this phase of the operation, the price-per-pound selectors are mechanically locked against movement, by the cooperative action of the pawl 475 and stud 485 previously described in connection with Fig. 24.

In normal operation, the cycle of the apparatus as described above will terminate upon return of switch 515 to its home position and will not be repeated. This action is assured by the relay 610, which corresponds to the relay designated "260" in application Serial No. 436,218. Thus when the switch 515 moves to its number 2 position, its wiper 2 grounds the positive end of the operating coil of relay 610 through connection 611, the voltage being dissipated through the resistor 609 to cause relay 610 to open.

Opening of the relay 610 breaks the self-locking connection effected between its contacts 612 so that it will not again be closed until wire 613 is grounded in response to removal of weight from the platter of the scale. Wire 613 leads to a terminal N which in turn connects to a switch forming part of the scale and effective to close only when the weight is removed from the scale—such as the No Load relay N as disclosed in my above application Serial No. 376,136. Thus the operation of the computer is initiated upon completion of a weighing operation by grounding of the wire 614, through a switch mechanism effective when the scale has reached its balanced position with a weight on the platter, a suitable such mechanism for accomplishing this result forming a part of the follow-up means of the scale described in my said application Serial No. 376,136, namely the control relay C of said application as indicated at C in Fig. 26a. It is this temporary grounding of line 614 which causes switch 515 to move from its position 1 to position 2 as described in application Serial No. 436,218, but even though wire 614 is grounded upon completion of the cycle, wire 583 will not be grounded owing to the contacts 615 of relay 610 being open, and the switch 515 will therefore not make an improper repeat operation.

The opening of relay 610 as described also closes its back contacts 615, which ground the terminal of the indicator light 37 on the scale, and the lighting of this light is a signal to the scale operator that the load has now been weighed and may be removed and replaced by a new load on the platter. This removal of the load at this point will not affect the further completion of the computing and printing operations, because the motor in the follow-up means of the scale remains deenergized until the switch 515 reaches its 10 position as described in detail in application Serial No. 436,218. Figs. 1 and 26a also show a push-button switch 620, which corresponds to the switch designated as "280" in application Serial No. 436,218, and which may be used to initiate manual operation of the complete cycle for test purposes or when the load is too light to actuate the No Load relay. For example, the switch 620 will cause the apparatus to print a ticket showing zero values for weight and price when there is no load on the platter.

It will also now be apparent that the system of the invention can carry on different operations simultaneously on as many as three separate loads, with different portions of the system sharing the same time and thereby contributing to speed of operation without sacrificing accuracy. Thus as soon as the indicator light 37 is energized as described, the scale operator is informed that the first load can be replaced on the platter 31 by a second load without affecting the reading of the weihgt of the first load. The weighing mechanism is free to be deflected in the proper direction depending upon whether the second load is heavier or lighter than the first while the read-out of the first weight is being completed and transmitted to the computer. The read-out is completed when the switch 515 reaches its 10 position as described in application Serial No. 436,218, and at this point the follow-up means is free to be reactuated by the weighing mechanism. Thereafter, when the computing operation has been completed and the printing operation has proceeded to the point at which the relay 530 is opened, the computer will be caused by return to its position 1 to receive the read-out for the second load simultaneously with the remainder of the printing cycle for the first load, and finally the read-out means will then be released for reactuation by movement of the weighing mechanism caused by a third load during completion of the computing and printing operations on the first and second loads.

It will also be apparent that in the event of improper operation of the printer as described which results in failure to energize all of the solenoids 285, the corresponding failure of relay 560 to open will prevent return of the computer to its home position and will thereby stop uncorrected further operation of the entire system.

Provision is also made for repeat printing of tickets of the same weight, price and price per pound by repeat operation of the printing mechanism without repeating the computing operation. The repeat switch 625 is normally in the position shown in Fig. 26a. When this switch is closed, the initial operation of the apparatus is the same as already described until the switch 515 reaches its position 19, at which point relay 573 is energized through the line 626 and the resistor 627. This opens the normally closed contacts 572 of relay 573 and thus breaks the connection between the lines 570 and 571 so that switch 515 is unable to move from its position 19.

In these circumstances, when the printer has completed one operation up to the point at which the relay 543 is open, relay 560 will be deenergized, unless an error has occurred in the printer. Further, since switch 515 is at its position 19, an additional relay 630 is energized through switch 625 and the line 631 through the back contacts 632 of relay 560 and the back contacts 594 of relay 543. Energization of relay 630 closes its contacts 633 to provide a ground on the line 529 to re-cycle the printer.

This repeat operation will then continue so long as switch 625 is closed unless the weight is changed on the scale or unless the price per pound is changed during that portion of the printing cycle when it is mechanically possible to do so. If the weight on the scale is changed during a repeat operation, the relay 610 will operate, thus placing a ground on the line 634 through its contacts 635 and shunting the relay 573 by means of the resistor 627 so that the relay 573 is deenergized. The computer switch 515 can then return to its home position at the end of the printing cycle and thereafter re-compute for the changed weight.

If during repeat printing, the price per pound is changed as noted above, the relay 520 will open, thus breaking the starting line 529 to the printer. Further operation will require closing of the reset switch 580 to cause recycling of switch 515 by providing a ground on lines 595 and 571 through a line 640 and the back contacts 641 of relay 520 to the line 570, thereby advancing switch 515 to its home position to re-cycle the computer and reset relay 520. After this resetting, the repeat cycle continues until further interruption.

The essential relationships of the system of the invention are illustrated in the block diagram of Fig. 27. As shown, the weighing mechanism of the scale incorporates a weight read-out which supplies the weight data in digital form as one input factor for the computer, and the weight read-out also supplies the weight data in digital form to the corresponding printer input to effect setting of the printing wheels as described above. The connections for supplying the weight input data from the weighing mechanism to the printer are shown in the wiring diagram as including the stepping switches W, X, Y and Z in the computer, but this is primarily for convenience and is not an essential arrangement as distinguished from connections independent from the computer for the same purpose.

Fig. 28 illustrates mechanical details of the weight read-out mechanism as shown in Serial No. 436,218, including a fragment 700 of the main lever which moves through a distance proportional to weight and is arranged to actuate an upper switch 701 or a lower switch 702. The switches 701 and 702 are both mounted on a bracket 705 and are connected by lines 706 and 707 respectively to a drive motor 710 which is thus caused to rotate selectively forward or backward depending upon whether lever 700 actuates switch 701 or switch 702. The motor 710 drives a worm shaft 711 which rotates a worm gear 712 on a shaft or lead screw 713 extending through a complementary nut 714 fixed to the bracket 705. This forms a follow-up system for moving the bracket 705 and the switches 701 and 702 so that in response to a displacement of the lever, the motor 710 will be energized in the proper direction and will continue in operation for a sufficient amount of travel to restore the switches 701 and 702 to the illustrated neutral position with respect to the lever 700, and at this time the motor 710 will come to rest.

The lever 700 having moved to a position corresponding to the weight, the motor shaft 711 has thus turned through an angle directly corresponding to the weight on the scale. In order to transmit an indication of that angle and hence of the weight represented thereby, the shaft 711 is extended as shown at 715 to drive a read-out mechanism indicated diagrammatically at 720 which is in turn connected as indicated diagrammatically at 721 with the computer 35.

Fig. 27 further emphasizes the provision in accordance with the invention of the unit price selector as a part of the printer which performs a dual function. Thus the unit price selector is directly connected as described with the printing wheels in the printer which print the unit price on the ticket or other printed record. In addition, there are interconnections between the unit price selector and the computer which develop data in digital form incorporating the weight as one factor and the unit price as the other factor and then supply this digital data to the computer. More specifically, the computer supplies selected digits of the weight factor to the unit price selector, and since the latter is shown as incorporating a precomputed multiplication table, including the selector switch 77 as previously described, it produces partial products incorporating the weight and unit price factors and supplies these partial products back to the computer. If the precomputed multiplication table is incorporated in the computer, as shown in my above application Serial No. 436,218, then the partial products are also produced in the computer utilizing the unit price factor supplied thereto by the unit price selector.

Fig. 27 illustrates that the computer, as previously described, programs the multiplying operations of the unit price selector and effects the summation thereof as an output representing value for delivery to the value input of the printer. Fig. 27 shows the arrangement in accordance with the invention of the commodity identifying means as a part of the printer as described in detail hereinabove, and finally Fig. 27 illustrates the cooperative relationships of all these selective controls with the computer and printer in issuing the desired printed record of the united price, weight, value and identity of the weighed commodity.

It will thus be seen that in accordance with the present invention, the scale installation shown in Fig. 1 will operate as a complete unit to weigh successive loads placed on the scale platter, to compute the price of the weighed load in accordance with the preset unit price of the commodity being weighed, and to print a ticket or label bearing the weight, value and unit price of the load together with the correct designations of the identity and grade of the load. The operation of the complete scale unit is comparatively rapid, requiring as little as 2 to 3 seconds from the time the load is placed on the platter until the printed ticket emerges from the printing mechanism. Furthermore, it is not necessary for the operator to wait until the printed ticket has been issued before continuing to the next load, since the printing operation can be carried on while the scale and the computer are in the process of weighing and computing the value of the next load. As pointed out, the invention incorporates special provisions for making such overlapping operations possible without affecting the accuracy of either, and also for notifying the operator when the complete cycle of operations has reached the stage at which the weighed load can be replaced by a new load.

It will accordingly be seen that the invention offers outstanding practical advantages of speed, convenience and accuracy. For example, no manual operations are required other than the loading and unloading of the platter. Furthermore, in conventional practice for handling pre-packaged foods such as meats, the weight and computed value of each load is transferred manually to the mechanism for printing the tickets or label. Such procedure consumes a very much longer time than the complete cycle of operation of the ticket printing scale of the present invention, and obviously it also introduces a considerable possibility of human error in transferring the operation of the computer to the printer, a disadvantage which is completely eliminated by the present invention.

In addition to the above advantages, the present invention offers further specific features enhancing its practical value. For example, if an error should be made in the printing mechanism, provision is made by the invention both for preventing further operations until the error has been corrected and also for immediately notifying the operator of both the occurrence and the nature of the error so that the time for correction is correspondingly reduced. Similar provision is made for notifying the operator of the necessity for changing the supply of ticket material in the printer as a further safe-guard against improper operation of the apparatus. At the same time, it should be noted that the invention is not limited to use in conjunction with a scale, since the operation of the ticket printing mechanism of the invention is responsive to the data supplied thereto by means of the plurality of electrical circuits which determine the instant of operation of each of the indexing members for the several indicator wheels, and the information which this data represents may take many desired forms.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a system for weighing and producing a printed record of the weight and of the unit price and value of commodities of different types and unit prices, the combination of a weighing mechanism including electrical means for producing representation of the weight factor in digital form, a printer having inputs for the weight and unit price factors and for value, a unit price selector mechanism forming part of said printer and including a plurality of elements each representing different columns of unit price and movable to a series of positions corresponding to different integer values in said columns, commodity identifying means associated with said printer and adapted to be set to represent different commodities, a computer having a digital weight input and an output representing value in digital form, electrical connections from said weighing mechanism for supplying said weight factor digits to said computer and said printer weight inputs, electrical interconnections between said unit price selector mechanism and said computer for developing data in digital form incorporating the unit price factor and for introducing said digital data to said computer, electrical connections from said computer output to said printer value input to transmit the computed value data thereto, switch means for sensing a change in the setting of said commodity identifying means, switch means for sensing the setting of any one of said unit price selector elements to a position other than an integer value position, switch means for sensing a change in the setting of said unit price selector mechanism occurring during the course of operation of said computer, means for causing said printer to carry out a printing cycle utilizing said data from said weighing mechanism and said computer, and means connected with each of said sensing means responsive to actuation of any one of said sensing means for preventing said cycle of said printer.

2. In a system for weighing and producing a printed record of the weight and of the unit price and value of commodities of different types and unit prices, the combination of a weighing mechanism including electrical means for producing a representation of the weight factor in digital form, a printer having inputs for the weight and unit price factors and for value, a unit price selector mechanism forming part of said printer and adapted to be set to a series of different unit prices, a computer having a digital weight input and an output representing value in digital form, electrical connections from said weighing mechanism for supplying said weight factor digits to said computer and said printer weight inputs, electrical interconnections between said unit price selector mechanism and said computer for developing data in digital form incorporating the unit price factor and for introducing said digital data to said computer, electrical connections from said computer output to said printer value input to transmit the computed value data thereto, means for causing said printer to carry out a printing cycle utilizing said data from said weighing mechanism and said computer, and electrical relay means responsive to a change in the setting of said unit price selector mechanism occurring during the course of operation of said computer for preventing said cycle of said printer.

3. In a system for weighing and producing a printed record of the weight and of the unit price and value of commodities of different types and unit prices, the combination of a weighing mechanism including electrical means for producing a representation of the weight factor in digital form, a printer having inputs for the weight and unit price factors and for value, a unit price selector mechanism forming part of said printer and adapted to be set to a series of different unit prices, commodity identifying means also forming part of said printer and adapted to be set to represent different commodities, a computer having a digital weight input and an output representing value in digital form, electrical connections from said weighing mechanism for supplying said weight factor digits to said computer and said printer weight inputs, electrical interconnections between said unit price selector mechanism and said computer for developing data in digital form incorporating the unit price factor and for introducing said digital data to said computer, electrical connections from said computer output to said printer value input to transmit the computed value data thereto, means for causing said printer to carry out a printing cycle utilizing said data from said weighing mechanism and said computer, and electrical relay means responsive to a change in the setting of said commodity identifying means for preventing said cycle of said printer unless said change is accompanied by a change in the setting of said unit price selector mechanism.

4. In a system for weighing and producing a printed record of the weight and of the unit price and value of commodities of different types and unit prices, the combination of a weighing mechanism including electrical means for producing a representation of the weight factor in digital form, a printer having inputs for the weight and unit price factors and for value, a unit price selector mechanism including a plurality of elements each representing different columns and movable to a series of positions corresponding to different integer values in the several columns, the setting of said elements representing a selected unit price, a computer having a digital weight input and an output representing value in digital form, electrical connections from said weighing mechanism for supplying said weight factor digits to said computer and said printer weight inputs, electrical interconnections between said unit price selector mechanism and said computer for developing data in digital form incorporating the unit price factor and for introducing said digital data to said computer, electrical connections from said computer output to said printer value input to transmit the computed value data thereto, means for causing said printer to carry out a printing cycle utilizing said data from said weighing mechanism and said computer, and electrical relay means responsive to the setting of any of said elements to a position other than an integer value position for preventing said cycle of said printer.

5. In a system for weighing and producing a printed record of the weight and of the unit price and value of commodities of different types and unit prices, the combination of a weighing mechanism including electrical means for producing a representation of the weight factor in digital form, a printer having inputs for the weight and unit price factors and for value, a unit price selector mechanism forming part of said printer and including a plurality of elements each representing different columns of unit price and movable to a series of positions corresponding to different integer values in said columns, commodity identifying means associated with said printer and adapted to be set to represent different commodities, a computer having a digital weight input and an output representing value in digital form, electrical connections from said weighing mechanism for supplying said weight factor digits to said computer and said printer weight inputs, electrical interconnections between said unit price selector mechanism and said computer for developing data in digital form incorporating the unit price factor and for introducing said digital data to said computer, electrical connections from said computer output to said printer value input to transmit the computed value data thereto, switch means for sensing a change in the setting of said commodity identifying means, switch means for sensing the setting of any one of said unit price selector elements to a position other than an integer value position, switch means for sensing a change in the setting of said unit price selector mechanism occurring during the course of operation of said computer, signal means associated with all of said sensing means, and means connected with each of said sensing means responsive to actuation of any one of said sensing means for actuating said signal means.

6. In a system for weighing and producing a printed record of the weight and of the unit price and value of commodities of different types and unit prices, the combination of a weighing mechanism including electrical means for producing a representation of the weight factor in digital form, a printer having inputs for the weight and unit price factors and for value, a unit price selector mechanism forming part of said printer and adapted to be set to a series of different unit prices, a computer having a digital weight input and an output representing value in digital form, electrical connections from said weighing mechanism for supplying said weight factor digits to said computer and said printer weight inputs, electrical interconnections between said unit price selector mechanism and said computer for developing data in digital form incorporating the unit price factor and for introducing said digital data to said computer, electrical connections from said computer output to said printer value input to transmit the computed value data thereto, a signal device, and electrical relay means responsive to a change in the setting of said unit price selector mechanism occurring during the course of operation of said computer for actuating said signal device.

7. In a system for weighing and producing a printed record of the weight and of the unit price and value of commodities of different types and unit prices, the combination of a weighing mechanism including electrical means for producing a representation of the weight factor in digital form, a printer having inputs for the weight and unit price factors and for value, a unit price selector mechanism forming part of said printer and adapted to be set to a series of different unit prices, commodity identifying means also forming part of said printer and adapted to be set to represent different commodities, a computer having a digital weight input and an output representing value in digital form, electrical connections from said weighing mechanism for supplying said weight factor digits to said computer and said printer weight inputs, electrical interconnections between said unit price selector mechanism and said computer for developing data in digital form incorporating the unit price factor and for introducing said digital data to said computer, electrical connections from said computer output to said printer value input to transmit the computed value data thereto, a signal device, and electrical relay means responsive to a change in the setting of said commodity identifying means for actuating said signal device unless said change is accompanied by a change in the setting of said unit price selector mechanism.

8. In a system for weighing and producing a printed record of the weight and of the unit price and value of commodities of different types and unit prices, the combination of a weighing mechanism including electrical means for producing a representation of the weight factor in digital form, a printer having inputs for the weight and unit price factors and for value, a unit price selector mechanism including a plurality of elements each representing different columns and movable to a series of positions corresponding to different integer values in the several columns, the setting of said elements representing a selected unit price, a computer having a digital weight input and an output representing value in digital form, electrical connections from said weighing mechanism for supplying said weight factor digits to said computer and said printer weight inputs, electrical interconnections between said unit price selector mechanism and said computer for developing data in digital form incorporating the unit price factor and for introducing said digital data to said computer, electrical connections from said computer output to said printer value input to transmit the computed value data thereto, a signal device, and electrical relay means responsive to the setting of any of said elements to a position other than an integer value position for actuating said signal device.

9. In a system for weighing and producing a printed record of the weight and of the unit price and value of commodities of different types and unit prices, the combination of a weighing mechanism movable to an operated position corresponding to the weight of the load thereon, a printer including a plurality of adjustable printing elements, a unit price selector mechanism forming part of said printer and adapted to be set to a series of different unit prices, a computer having inputs for weight and unit price respectively and including means movable to an operated position providing an output representing value, connections from said weighing mechanism and from said unit price selector mechanism to said respective computer inputs, means actuated by said computer output for causing said printer to carry out a printing cycle including indexing of said printing elements therein and actuation of said indexed printing elements to produce a printed record of the unit price and of the weight and value of the load on said weighing mechanism, and a selective control for causing said printer to repeat the complete said cycle thereof and to produce successive duplicate said records while retaining said inputs and output of said computer in the respective positions thereof at the end of said weighing and computing actions with respect to said load.

10. In a system for weighing and producing a printed record of the weight and of the unit price and value of commodities of different types and unit prices, the combination of a weighing mechanism movable to an operated position corresponding to the weight of the load thereon, a printer including a plurality of adjustable printing elements, a unit price selector mechanism forming part of said printer and adapted to be set to a series of different prices per pound, a computer having inputs for weight and unit price respectively and including means movable to an operated position providing an output representing value, connections from said weighing mechanism and from said unit price selector mechanism to said respective computer inputs, means actuated by said computer output for causing said printer to carry out a printing cycle including indexing of said printing elements therein and actuation of said indexed printing elements to produce a printed record of the unit price and of the weight and value of the load on said weighing mechanism, a selective control for causing said printer to repeat the complete said cycle thereof and to produce successive duplicate said records while retaining said inputs and output of said computer in the respective positions thereof at the end of said weighing and computing actions with respect to said load, and means responsive to change in any of said inputs for preventing further recycling of said printer prior to recycling of said computer.

11. In a scale unit adapted to provide a visual record of the weight and value of the successive weighed loads and including a weighing mechanism having a platter for receiving the successive loads, the combination of a plurality of register members arranged in groups representing weight and price respectively and each group including a plurality of columns, means mounting said register members for individual movement through a series of positions representing the series of values in the respective said column, a scanner arranged to traverse a series of stations corresponding to said series of values, a plurality of circuits each associated with one of said register members and the corresponding one of said weight and price columns, selector means associated with each of said weight columns and operated by said weighing mechanism to connect the corresponding said circuit with a selected one of said stations of said scanner corresponding to the value in said weight column for a particular load, computing means actuated by said scale and associated with each of said price columns for connecting the corresponding said circuit with a selected one of said stations of said scanner corresponding to the value in said price column for said particular load, drive means for causing said scanner to traverse said series of stations thereof in succession, and means responsive to arrival of said scanner at each said selected station thereof for effecting movement to the corresponding said position of each said register member whose associated circuit is connected with said station.

12. In a scale unit adapted to provide a visual record of the weight and value of the successive weighed loads and including a weighing mechanism having a platter for receiving the successive loads, the combination of a plurality of register members arranged in groups representing weight and price respectively and each group including a plurality of columns, means mounting said register members for individual movement through a series of positions representing the series of values in the respective said column, a scanner arranged to traverse a series of stations corresponding to said series of values, an indexing member for each said register member mounted for movement with said scanner through a corresponding series of indexing positions, a plurality of circuits each associated with one of said indexing members and the corresponding one of said weight and price columns, selector means associated with each of said weight columns and operated by said weighing mechanism to connect the corresponding said circuit with a selected one of said stations of said scanner corresponding to the value in said weight column for a particular load, computing means actuated by said scale in association with each of said price columns and including additional selector means for connecting the corresponding said circuit with a selected one of said stations of said scanner corresponding to the value in said price column for said particular load, drive means for causing said scanner to traverse said series of stations thereof in succession, means responsive to arrival of said scanner at each said selected station thereof for effecting stopping at the corresponding said indexing position of each said indexing member whose associated circuit is connected with said selected station, and means cooperating with said indexing means to move said register members to the positions thereof thus selected by all said selector means.

13. In a ticket printing scale unit adapted to issue successive printed tickets bearing the weight and value of the successive weighed loads and including a weighing mechanism having a platter for receiving the successive loads, the combination of a plurality of type wheels arranged in groups representing weight and price respectively and each group including a plurality of columns, means mounting said type wheels for individual rotation through a series of positions representing the series of values in the respective said column, a scanner arranged to traverse a series of stations corresponding to said series of values, a plurality of circuits each associated with one of said type wheels and the corresponding one of said weight and price columns, selector means associated with each of said weight columns and operated by said weighing mechanism to connect the corresponding said circuit with a selected one of said stations of said scanner corresponding to the value in said weight column for a particular load, computing means actuated by said scale in association with each of said price columns and including additional selector means for connecting the corresponding said circuit with a selected one of said stations of said scanner corresponding to the value in said price column for said particular load, drive means for causing said scanner to traverse said series of stations thereof in succession, means responsive to arrival of said scanner at each said selected station thereof for effecting indexing to the corresponding said position of each said type wheel whose associated circuit is connected with said station, and means cooperating with said indexed type wheels to print a ticket.

14. In a register of the character described, the combination of a plurality of register members each mounted for movement through a series of positions representing a series of values, a scanner arranged to traverse a corresponding series of stations, a plurality of circuits each associated with one of said register members, selector means for connecting each said circuit with a selected one of said stations of said scanner, drive means having an operating cycle for causing said scanner to traverse said series of stations, means movable with said scanner and responsive to passage of said scanner through each said selected station thereof for effecting movement of the associated said register member to the corresponding said position, electrical relay means responsive to failure of said selector means to connect every said circuit with one of said scanner stations for giving a signal of said failure, and reset means for correcting for said failure.

15. In a scale unit adapted to provide a visual record of the weight and value of the successive weighed loads and including a weighing mechanism having a platter for receiving the successive loads, the combination of a plurality of register members arranged in groups representing weight and price respectively and each group including a plurality of columns, means mounting said register members for individual movement through a series of positions representing the series of values in the respective said column, indexing means associated with each of said weight columns and actuated by said weighing mechanism to effect indexing of the corresponding said register members to the positions thereof corresponding to the value in said weight column for a particular load, means including a computer actuated by said scale and associated with each of said price columns for effecting indexing of the corresponding said register members to the positions thereof corresponding to the value in said price columns for said particular load, electrical relay means responsive to failure of any one of said register members to reach the proper position thereof determined by said weighing mechanism and said computer for preventing further operation of said computer, and reset means for correcting for said failure.

16. In a system for weighing and pricing articles having different unit prices and producing a printed record of the value thereof, the combination of a mechanism for weighing an article and including means for producing an analogue response corresponding to the precise weight of said article, electrical readout means for reading out said analogue response in digits of a plurality of orders of value corresponding to the precise position of said analogue response, a printer having inputs for the weight and unit price factors and for value, a unit price selector mechanism forming part of said printer and adapted to be preset to different positions to supply a selected unit price to said printer unit price input, a computer having a digital weight input and an output representing value in digital form, electrical connections for transmitting the digits of weight from said read-out means to said computer weight input, means including electrical interconnections between said unit price selector mechanism and said computer for effecting multiplication of said weight digits by said selected unit price, electrical connections for transmitting the resulting computed value digits from said computer output to said printer value input, electrical connections from said read-out means to said printer weight input to transmit said weight digits thereto, means rendering effective said electrical connections and interconnections in response to completion of the weighing operation of said weighing mechanism, and means in said printer operated by said electrical connections to said inputs thereof for printing a record identifying the weight and the unit price and value of said article.

17. In a system for weighing and pricing articles having different unit prices and producing a printed record of the value thereof, the combination of a mechanism for weighing an article and including means for producing an analogue response corresponding to the precise weight of said article, electrical read-out means for reading out said analogue response in digits of a plurality of orders of value corresponding to the precise position of said analogue response, a printer having inputs for the weight and unit price factors and for value, a unit price selector mechanism forming part of said printer and adapted to be preset to different positions to supply a selected unit price to said printer unit price input, a computer having a digital weight input and an output representing value in digital form, electrical connections for transmitting the digits of weight from said read-out means to said computer weight input, means including electrical interconnections between said unit price selector mechanism and said computer for producing partial products in digital form of said weight digits and of said selected unit price, means in said computer for programming said multiplying operation and effecting digital summation of said partial products, electrical connections for transmitting the resulting computed value digits from said computer output to said printer value input, electrical connections from said read-out means to said printer weight input to transmit said weight digits thereto, means rendering effective said electrical connections and interconnections in response to completion of the weighing operation of said weighing mechanism, and means in said printer operated by said electrical connections to said inputs thereof for printing a record identifying the weight and the unit price and value of said article.

18. In a system for weighing and pricing articles having different unit prices and producing a printed record of the value thereof, the combination of a mechanism for weighing an article and including means for producing an analogue response corresponding to the precise weight of said article, electrical readout means for reading out said analogue response in digits of a plurality of orders of value corresponding to the precise position of said analogue response, a printer having inputs for the weight and unit price factors and for value, a unit price selector mechanism forming part of said printer and adapted to be preset to different positions to supply a selected unit price to said printer unit price input, a computer having a digital weight input and an output representing value in digital form, electrical connections for transmitting the digits of weight from said read-out means to said computer weight input, means including electrical interconnections between said unit price selector mechanism and said computer for effecting multiplication of said weight digits by said selected unit price, electrical connections for transmitting the resulting computed value digits from said computer output to said printer value input, electrical connections from said read-out means to said printer weight input to transmit said weight digits thereto, means rendering effective said electrical connections and interconnections in response to completion of the weighing operation of said weighing mechanism to effect said computing operation of said computer, electrical relay means responsive to completion of the computing operation of said computer for causing said printer to print a record identifying the weight and the unit price and value of said article.

19. In a register of the character described, the combination of a plurality of register members corresponding respectively to a plurality of orders and each mounted for movement through a series of positions representing a series of values in said column, a scanner mounted for movement through a series of stations corresponding to said series of positions a separate indexing member associated with each said register member and movable through a corresponding series of indexing positions wherein it limits movement of the associated said register member, means mounting said indexing members for movement with and with respect to said scanner, means for driving said scanner and said indexing members simultaneously through said series of stations and positions thereof, selectively operable stop means associated with each said indexing member and effective upon operation thereof to stop said associated indexing member at a selected one of said positions while said scanner continues to move through the remainder of said series of stations, a circuit associated with each said stop means, selector means operable in advance of said movement of said scanner for connecting each said circuit with a selected one of said stations corresponding to a desired one of said values, means responsive to passage of said scanner through each said station for actuating each said stop means whose associated said circuit is connected with said station to stop the associated said indexing member at the corresponding said position thereof while said scanner continues to move with the remaining said indexing members, and means operable upon completion of the passage of said scanner through all of said stations for effecting movement of said register members to the respective positions thereof determined by said operation of said stop means on the associated said indexing members.

20. In a register of the character described, the combination of a plurality of register members corresponding respectively to a plurality of orders and each mounted for rotation through a series of positions representing a series of values in said column, an indexing segment associated with each said register member, means mounting said segments for rotation through a series of indexing positions wherein each thereof limits movement of the associated said register member, a series of contacts corresponding with said indexing positions, a scanner mounted for rotation with and with respect to said segments across said series of contacts, means for driving said scanner and said segments simultaneously, selectively operable stop means for stopping each said segment at a selected one of said indexing positions while said scanner continues to move across the remainder of said contacts, a circuit associated with each said stop means, selector means operable in advance of said movement of said scanner for connecting each said circuit with a selected one of said contacts corresponding to a desired one of said values, means responsive to passage of said scanner across each said contact for actuating each said stop means whose associated said circuit is connected with said contact to stop the associated said indexing segment at the corresponding said indexing position thereof, and means operable upon completion of said movement of said scanner for rotating each said register member through an arc controlled by the position of its associated said segment determined by said action of the associated said stop means to establish the desired indexed position of said register member.

21. In a register of the character described, the combination of a plurality of register members corresponding respectively to a plurality of orders and each mounted for movement through a series of positions representing a series of values in said column, a scanner mounted for movement through a series of stations corresponding to said series of positions, a separate indexing member associated with each said register members and movable through a corresponding series of indexing positions wherein it limits movement of the associated said register member, means for driving said scanner in a cycle of forward and return movement through said series of stations, means for causing conjoint advance movement of said indexing member with said scanner, selectively operable stop means associated with each said indexing member and effective upon operation thereof to stop said associated indexing member at a selected one of said positions while said scanner continues to return through the remainder of said series of stations, a circuit associated with each said stop means, selector means operable in advance of said cycle of said scanner for connecting each said circuit with a selected one of said stations corresponding to a desired one of said values, means responsive to forward passage of said scanner through each said station for actuating each said stop means whose associated said circuit is connected with said station to stop the associated said indexing member at the corresponding said position thereof while said scanner continues to move with the remaining said indexing members, and means operable during said return movement of said scanner for effecting movement of said register members to the respective positions thereof determined by said operation of the associated stop means.

22. In a register of the character described, the combination of a plurality of register members corresponding respectively to a plurality of orders and each mounted for rotation through a series of positions representing a series of values in said column, an indexing segment associated with each said register member, means mounting said segments for rotation through a series of indexing positions wherein each thereof limits movement of the associated said register member, a series of contacts corresponding with said indexing positions, a scanner mounted for rotation across said series of contacts, means for driving said scanner in a cycle of forward and return movement across said series of contacts, means responsive to said forward movement of said scanner for causing corresponding forward movement of said indexing segments through said indexing positions, selectively operable stop means for stopping each said segment at a selected one of said indexing positions while said scanner continues to move across the remainder of said contacts, a circuit associated with each said stop means, selector means operable in advance of said cycle of said scanner for connecting each said circuit with a selected one of said contacts corresponding to a desired one of said values, means responsive to passage of said scanner across each said contact for actuating each said stop means whose associated said circuit is connected with said contact to stop the associated said indexing segment at the corresponding said indexing position thereof, and means operable during said return movement of said scanner for rotating each said register member and its associated said segment conjointly through arcs determined by said action of the associated said stop means to establish the desired indexed position of said register member.

23. In a register of the character described, the combination of a plurality of register members corresponding respectively to a plurality of orders and each mounted for rotation through a series of positions representing a series of values in said column, a pair of indexing and driving segments associated with each said register member, means mounting said segments for rotation through a series of indexing positions, a series of contacts corresponding with said indexing positions, a scanner mounted for rotation across said series of contacts, means for driving said scanner in a cycle of forward and return movement across said series of contacts, means responsive to said forward movement of said scanner for causing corresponding forward movement of said indexing segments through said indexing positions and for causing movement of said driving segments driving said register members to the zero stations thereof, selectively operable stop means for stopping each said indexing segment at a selected one of said indexing positions while said scanner continues to move across the remainder of said contacts, a circuit associated with each said stop means, selector means operable in advance of said cycle of said scanner for connecting each said circuit with a selected one of said contacts corresponding to a desired one of said values, means responsive to passage of said scanner across each said contact for actuating each said stop means whose associated said circuit is connected with said contact to stop the associated said indexing segment at the corresponding said indexing position thereof, means for coupling each said pair of segments together, and means operable during said return movement of said scanner for causing said coupled segments to drive said register members through arcs determined by the indexed positions of said indexing segments to establish the desired indexed position of said register member.

24. In a system for weighing, computing and printing a record of the weight and value of each of a plurality of successively weighed loads, the combination of a scale including a lever adapted to be deflected away from a zero reference position in proportion to the weight of a first load applied to the scale to a first balance position corresponding to said first load, follow-up means actuated by deflection of said lever to a first position corresponding to said first balance position of said lever, a computer for computing the value of each weighed load, means responsive to establishment of said first position of said follow-up means for reading out data corresponding to said position and transmitting said data to said computer, means effective upon completion of said operation of said read-out means for causing reactuation of said follow-up means to a second position upon deflection of said lever resulting from replacement of said first load by a second load, means for causing said computer to compute the value of said first load simultaneously with said reactuation of said follow-up means, means responsive to completion of the computing operation of said computer for printing a record of the weight and value of said first load, and means actuated by said printing means for conditioning said computer to start a new cycle in accordance with the weight of said second load transmitted thereto by said read-out means simultaneously with said printing operation for said first load and thereby to provide for reactuating of said follow-up means to a third position during said simultaneous computing and printing operations.

25. In a system for weighing, computing and printing a record of the weight and value of each of a plurality of successively weighed loads, the combination of a scale including a lever adapted to be deflected away from a zero reference position in proportion to the weight of a first load applied to the scale to a first balance position corresponding to said first load, follow-up means actuated by deflection of said lever to a first position corresponding to said first balance position of said lever, a computer for computing the value of each weighed load, means for reading out data corresponding to said first position of said follow-up means and transmitting said data to said computer, control means responsive to establishment of said first position of said follow-up means for blocking further movement thereof while leaving said lever free for further deflection resulting from replacement of said first load by a second load and for simultaneously initiating the operation of said read-out means for said first load, means for causing said computer to compute the value of said first load, means responsive to completion of the computing operation of said computer for printing a record of the weight and value of said first load, means responsive to completion of the operation of said read-out means for said first load for terminating said blocking action of said control means to provide for reactuation of said follow-up means upon said further deflection of said lever by said second load during completion of the operation of said computer and said printing means, and means actuated by said printing means for conditioning said computer to start a new cycle in accordance with the weight of said second load transmitted thereto by said read-out means simultaneously with said printing operation for said first load.

26. In a system for weighing, computing and printing a record of the weight and value of each of a plurality of successively weighed loads, the combination of a scale including a lever adapted to be deflected away from a zero reference position in proportion to the weight of a first load applied to the scale to a first balance position corresponding to said first load, follow-up means actuated by deflection of said lever to a first position corresponding to said first balance position of said lever, a computer for computing the value of each weighed load, means for reading out data corresponding to said first position of said follow-up means and transmitting said data to said computer, control means responsive to establishment of said first position of said follow-up means for blocking further movement thereof while leaving said lever free for further deflection resulting from replacement of said first load by a second load and for simultaneously initiating the operation of said read-out means for said first load, means for causing said computer to compute the value of said first load, means responsive to completion of the computing operation of said computer for printing a record of the weight and value of said first load, means responsive to completion of the operation of said read-out means for said first load for terminating said blocking action of said control means to provide for reactuation of said follow-up means upon said further deflection of said lever by said second load during completion of the operation of said computer and said printing means, means actuated by said printing means for conditioning said computer to start a new cycle in accordance with the weight of said second load transmitted thereto by said read-out means simultaneously with said printing operation for said first load, and means responsive to improper operation of said printing means for blocking said conditioning of said computer to stop uncorrected further operation of said system.

References Cited in the file of this patent

UNITED STATES PATENTS

| | | |
|---|---|---|
| 1,295,167 | Hollerith | Feb. 25, 1919 |
| 1,299,786 | Schantz | Apr. 8, 1919 |
| 1,517,858 | Odhner | Dec. 2, 1924 |
| 1,634,990 | Friden | July 5, 1927 |
| 1,870,004 | Green | Aug. 2, 1932 |
| 1,967,742 | Bryce | July 24, 1934 |
| 2,008,159 | Shipley | July 16, 1935 |

(Other references on following page)

UNITED STATES PATENTS

| | | |
|---|---|---|
| 2,041,752 | Fuller | May 26, 1936 |
| 2,045,435 | Bryce | June 23, 1936 |
| 2,045,437 | Daly | June 23, 1936 |
| 2,120,373 | Rast | June 14, 1938 |
| 2,147,626 | Bryce et al. | Feb. 21, 1939 |
| 2,209,763 | Breitling | July 30, 1940 |
| 2,376,234 | DeCastro | May 15, 1945 |
| 2,426,049 | Rabenda | Aug. 19, 1947 |
| 2,803,448 | Biebel | Aug. 20, 1957 |

FOREIGN PATENTS

| | | |
|---|---|---|
| 481,798 | Great Britain | Mar. 11, 1938 |

UNITED STATES PATENT OFFICE
CERTIFICATE OF CORRECTION

Patent No. 2,948,465                                          August 9, 1960

Kenneth C. Allen

It is hereby certified that error appears in the printed specification of the above numbered patent requiring correction and that the said Letters Patent should read as corrected below.

Column 9, line 69, for "rotataby" read -- rotatably --; column 10, line 45, for "guides 43" read -- guides 403 --; column 11, line 25, for "unuit" read -- unit --; column 15, line 53, for "to" read -- of --; column 17, line 45, for "weihgt" read -- weight --; column 19, line 40, for "united" read -- unit --; column 20, line 36, for "producing representation" read -- producing a representation --.

Signed and sealed this 31st day of January 1961.

(SEAL)
Attest:

KARL H. AXLINE                                                  ROBERT C. WATSON
Attesting Officer                                             Commissioner of Patents